(12) United States Patent
Thiele et al.

(10) Patent No.: US 10,432,456 B2
(45) Date of Patent: Oct. 1, 2019

(54) SYSTEMS AND METHODS FOR AUTOMATED COMMISSIONING OF VIRTUALIZED DISTRIBUTED CONTROL SYSTEMS

(71) Applicant: Fisher-Rosemount Systems, Inc., Round Rock, TX (US)

(72) Inventors: Dirk Thiele, Austin, TX (US); Shaobo Qiu, Austin, TX (US); Jessica Siu, Austin, TX (US); Forrest Stallings, Round Rock, TX (US); Joel Nicholas Ohmart, Round Rock, TX (US); Laura Milena Ramirez Rojas, Austin, TX (US)

(73) Assignee: FISHER-ROSEMOUNT SYSTEMS, INC., Round Rock, TX (US)

( * ) Notice: Subject to any disclaimer, the term of this patent is extended or adjusted under 35 U.S.C. 154(b) by 1153 days.

(21) Appl. No.: 14/497,608

(22) Filed: Sep. 26, 2014

(65) Prior Publication Data

US 2015/0095788 A1    Apr. 2, 2015

Related U.S. Application Data

(60) Provisional application No. 61/883,737, filed on Sep. 27, 2013.

(51) Int. Cl.
*G06F 15/173*    (2006.01)
*H04L 12/24*    (2006.01)
(Continued)

(52) U.S. Cl.
CPC .... *H04L 41/0806* (2013.01); *G05B 19/41845* (2013.01); *G06F 3/0482* (2013.01);
(Continued)

(58) Field of Classification Search
CPC .......................... H04L 41/0806; G06F 3/04817
(Continued)

(56) References Cited

U.S. PATENT DOCUMENTS

2003/0220838 A1*  11/2003  Ishii ...................... G06Q 30/02
                                                                    705/14.4
2009/0248897 A1*  10/2009  Boylan ............. H04L 29/12283
                                                                    709/245

(Continued)

FOREIGN PATENT DOCUMENTS

CN          101115070          1/2008
CN          101460954          6/2009
(Continued)

OTHER PUBLICATIONS

International Bureau, "International Preliminary Report on Patentability", issued in connection with International patent application No. PCT/US2014/057608, dated Apr. 7, 2016, 6 pages.

(Continued)

*Primary Examiner* — Vivek Srivastava
*Assistant Examiner* — Karina J Garcia-Ching
(74) *Attorney, Agent, or Firm* — Hanley, Flight & Zimmerman, LLC

(57) ABSTRACT

Systems and methods for automated commissioning of virtualized distributed control systems are disclosed. An example method includes accessing a data structure including a list of configuration names for network cards associated with first and second host servers of a virtual process control environment. The first and second host servers implement virtual machines corresponding to workstations for a process control system. The example method also includes when configuring the first host server, assigning a first name to a first one of the network cards associated with the first host server. The example method further includes when configuring the second host server, assigning the first name to a second one of the network cards associated with the second host server based on a user selection of the first (Continued)

name from the list of configuration names. The second host server is configured after the first host server.

17 Claims, 24 Drawing Sheets

(51) Int. Cl.
    *G06F 3/0481*     (2013.01)
    *G06F 3/0482*     (2013.01)
    *G05B 19/418*     (2006.01)
    *G06F 9/455*     (2018.01)
    *H04L 12/26*     (2006.01)

(52) U.S. Cl.
    CPC ...... *G06F 3/04817* (2013.01); *G06F 9/45558* (2013.01); *G05B 2219/31018* (2013.01); *G05B 2219/32345* (2013.01); *G06F 2009/4557* (2013.01); *H04L 41/085* (2013.01); *H04L 41/0883* (2013.01); *H04L 41/22* (2013.01); *H04L 43/0811* (2013.01); *Y02P 90/16* (2015.11); *Y02P 90/18* (2015.11); *Y02P 90/26* (2015.11)

(58) Field of Classification Search
    USPC .................................................. 709/223, 224
    See application file for complete search history.

(56) References Cited

U.S. PATENT DOCUMENTS

2010/0036948 A1\*   2/2010   Cassiday ............... G06F 9/5061
                                                                                       709/225
2011/0055375 A1\*   3/2011   Heim .................. G06F 11/0709
                                                                                       709/224
2011/0060428 A1     3/2011   Steele et al.

FOREIGN PATENT DOCUMENTS

DE       102007032611 A1     1/2009
WO      2012047654 A1     4/2012

OTHER PUBLICATIONS

International Searching Authority, "Search Report", issued in connection with PCT patent application No. PCT/US2014/057608, dated Feb. 3, 2015, 5 pages.

International Searching Authority, "Written Opinion", issued in connection with PCT patent application No. PCT/US2014/057608, dated Feb. 3, 2015, 4 pages.

Mahalik, "Design and development of system level software tool for DCS simulation" Advances in Engineering Software, Elsevier Science, Oxford, GB, vol. 34, No. 7, Jul. 1, 2003 (Jul. 1, 2003), pp. 451-465. (15 pages).

Peter Tsai, "Consistent Network Port Naming on Microsoft Windows Server 2012 Beta—Dell Developed and Dell Deployed", May 11, 2012, 4 pages.

Emerson Process Management, "DeltaV Virtual Studio", Jul. 2013, 11 pages.

Emerson Process Management, "DeltaV Virtualization", Jun. 2013, 22 pages.

State Intellectual Property Office of China, "Notification of the First Office Action," issued in connection with Chinese Patent Application No. 201480053095.1, dated Apr. 17, 2018, 21 pages.

\* cited by examiner

| Name | VHOST1 | VHOST2 | VHOST3 |
|---|---|---|---|
| Network Card Name Setup | | | |
| DeltaV Primary | | | |
| DeltaV Secondary | | | |
| Thin Client Primary | | | |
| Thin Client Secondary | | | |
| Dlink | | | |
| Remote Primary | | | |
| Remote Secondary | | | |
| Plant Lan | | | |

FIG. 5A

| Name | VHOST1 | VHOST2 | VHOST3 |
|---|---|---|---|
| Cluster Setup | | | |
| SAN Primary IP | 192.168.130.111 | 192.168.130.112 | 192.168.130.113 |
| SAN Primary Subnet | 255.255.254.0 | 255.255.254.0 | 255.255.254.0 |
| SAN Secondary IP | 192.168.132.111 | 192.168.132.112 | 192.168.132.113 |
| SAN Secondary Subnet | 255.255.254.0 | 255.255.254.0 | 255.255.254.0 |
| Cluster Management Primary IP | 192.168.128.10 | 192.168.128.20 | 192.168.128.30 |
| Cluster Management Primary Subnet | 255.255.255.0 | 255.255.255.0 | 255.255.255.0 |
| Cluster Management Primary DNS | 192.168.128.1 | 192.168.128.2 | 192.168.128.3 |
| Cluster Management Secondary IP | 192.168.129.10 | 192.168.129.20 | 192.168.129.30 |
| Cluster Management Secondary Subnet | 255.255.255.0 | 255.255.255.0 | 255.255.255.0 |
| Cluster Management Secondary DNS | 192.168.129.1 | 192.168.129.2 | 192.168.129.3 |
| Cluster Primary IP | 192.168.128.254 | | |
| Cluster Primary Subnet | 255.255.255.0 | | |
| Cluster Secondary IP | 192.168.129.254 | | |
| Cluster Secondary Subnet | 255.255.255.0 | | |
| Network Card Name Setup | | | |
| DeltaV Primary | | | |
| DeltaV Secondary | | | |
| Thin Client Primary | | | |
| Thin Client Secondary | | | |
| Dlink | | | |
| Remote Primary | | | |
| Remote Secondary | | | |
| Plant Lan | | | |

FIG. 5B

Create Virtual Machine

Machine Configuration

| Field | Value |
|---|---|
| Template Location: | C:\Templates |
| Host Name | OWR-DEV1 |
| Group: | Fermentation |
| Machine Name: | FERM-OP1 |
| Configured RAM (MB): | 4096 |
| Configured Processors | 4 |

☐ Enable VM Recovery  [Preferred Recovery Host]

DeltaV Configuration

| Field | Value |
|---|---|
| DeltaV Version: | 12.3 |
| Node Type: | DeltaV Workstation [Server 2008 R2] with AMS |
| Workstation type: | Operator Station as Remote Client Server |
| Workstation Configuration File: | C:\Templates\DevData.cfg |
| DeltaVAdmin Password | ●●●●●●●● |

Environment Settings

○ Workgroup Environment   ● Domain Environment

| Field | Value |
|---|---|
| Fully Qualified Domain Name: | HostNetwork |
| Domain Administrator User Name: | admin1 |
| Domain Administrator Password: | ●●●●●●● |

AMS Configuration

| Field | Value | |
|---|---|---|
| Server Plus Machine: | DefaultServerPlus | ☑ Set to Default |
| AMS Service User Password: | | ☑ Set to Default |
| AMS DB User Password: | | ☑ Set to Default |
| AMS DB Owner Password: | | ☑ Set to Default |
| AMS DB Viewer Password: | | ☑ Set to Default |

Network Configuration

| Virtual Network Card | Virtual Network Name | DeltaV Network Type |
|---|---|---|
| DeltaV Primary | Not Connected | Unassigned |
| DeltaV Secondary | Not Connected | Unassigned |
| Dlink | Not Connected | Unassigned |
| Remote Primary | Not Connected | Unassigned |
| Remote Secondary | Not Connected | Unassigned |
| Plant Lan | Not Connected | Unassigned |

[OK]  [Cancel]

FIG. 11

SYSTEMS AND METHODS FOR AUTOMATED COMMISSIONING OF VIRTUALIZED DISTRIBUTED CONTROL SYSTEMS

RELATED APPLICATION

This patent claims the benefit of U.S. Provisional Patent Application No. 61/883,737, which was filed on Sep. 27, 2013, and which is hereby incorporated by reference in its entirety.

FIELD OF THE DISCLOSURE

This disclosure relates generally to process control systems and, more particularly, to systems and methods for automated commissioning of virtualized distributed control systems.

BACKGROUND

A typical control system includes a network of many workstations, servers, controllers and I/O subsystems. The setup and maintenance of multiple systems needed for development, testing, training and on-line production can be expensive and time consuming. Support for these systems is further complicated when multiple software and hardware releases must be maintained; especially when legacy operating system (OS) software is not supported on newer replacement workstation hardware.

BRIEF DESCRIPTION OF THE DRAWINGS

FIGS. 5A and 5B illustrate example configuration data structures used in connection with the example virtual network configuration system of FIG. 2.

FIG. 11 is an example virtual machine creation dialogue used in connection with the example virtual network configuration system of FIG. 2.

DETAILED DESCRIPTION

Figure 1:
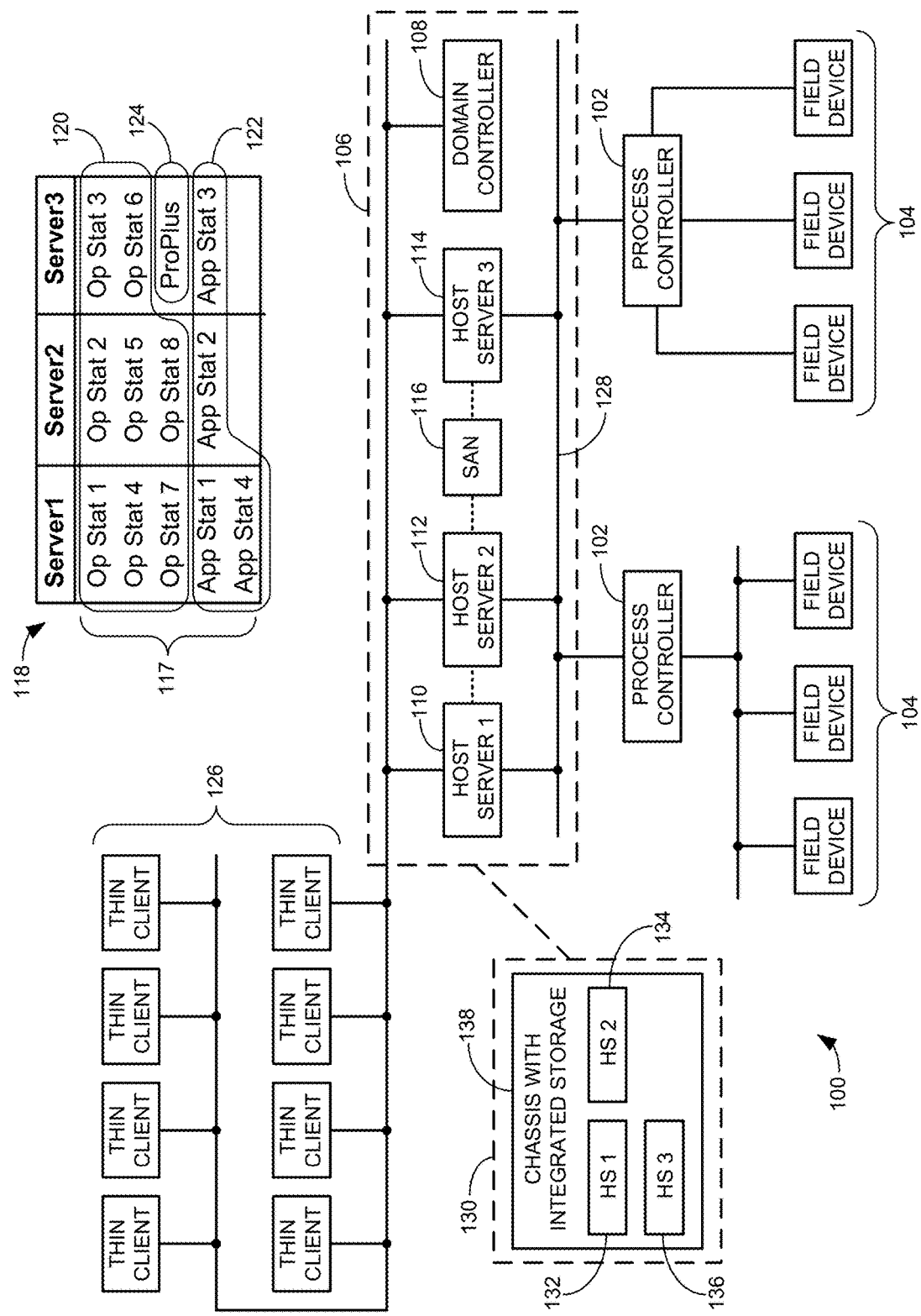
FIG. 1 is a schematic illustration of an example process control system within which the teachings of this disclosure may be implemented.

The combination of technology advances in computer architecture, networking, and virtualization has enabled the development of effective, easy to manage, virtualized computing environments. These virtualized environments have been used by IT departments to lower costs and improve system up-time. Put simply, virtualization is a way to encapsulate a computer, including its operating system and applications, so that it can be run on a host computer as a guest referred to as a virtual machine (VM). It is also possible to run multiple virtual machines from a host computer. A virtual machine is a file that contains everything needed to boot and run applications, except the hardware. To run a virtual machine, the host computer typically needs a virtualization software layer (e.g., a hypervisor such as Hyper-V™ by Microsoft™) that provides the mapping between the virtual machine and the hardware of the host computer, including network connections, USB ports, and other peripheral devices.

One of the biggest challenges for the success of virtualized systems, including process control systems, is the initial setup and the ongoing maintenance of the base infrastructure. The current deployment model of a distributed control system (DCS) like DeltaV™ without virtualization can include hundreds of computer workstations and server nodes in addition to the proprietary DCS hardware. At these volumes of computers, it becomes cost effective for original equipment manufacturers (OEM) and/or vendors (e.g., Dell) to pre-configure computer hardware. For example, hard drive images are created in conjunction with the control system vendor that are applied at the factory before the computer hardware is shipped out. However, medium and large scale virtualization requires many additional components that are not imageable, such as, for example, switches and/or a storage area network (SAN). As a result, the onsite setup of the system by end customers involves considerable IT overhead. In other words, while virtualization reduces simple computer setup overhead such as routing Ethernet, monitor and/or other computer cables and components, virtualization comes with an increased overhead of complex IT setup such as configuring virtual network switches, SAN devices, VLANs (virtual local area networks), etc. that may offset any gains anticipated from virtualization in terms of installation labor cost. Additionally, the ability to diagnose and maintain a more complex virtual appliance system also has costs associated with it.

One of the most complex steps of a highly available (HA) virtualized DCS setup is the storage area network (SAN) and cluster configuration. A cluster is a network of host servers that provide the physical backbone for implementing the virtualized process control system. Frequently, a cluster of host servers are configured to be connected to a common or shared memory storage location (hard drive). The cluster is configured such that each host interacts with the shared storage as if the storage is native to the individual host. Often, the shared storage connected to a cluster is implemented with a SAN device (frequently referred to simply as a SAN) which provides block level storage. A SAN configured cluster enables high availability in that if one host server fails, a virtual machine running on that host can be implemented automatically on another host server.

Often, SAN and cluster configuration for involves wiring each of the host servers and the SAN device in accordance with the Internet Small Computer System Interface (iSCSI) protocol. Such configuration procedures are prone to human error because there are many opportunities for one or more cables to be plugged into a wrong port, for the network cards and/or corresponding hosts to be labeled or tagged inconsistently, for Internet Protocol (IP) information (e.g., IP addresses) to be entered incorrectly (e.g., due to a typo), etc. Due to the technical nature of the configuration, it is not uncommon for an engineer to take multiple days to complete setup of a virtual process control environment. Furthermore, a fully configured system can be relatively fragile. For example, renaming host computer names or changing time zones can cause the cluster to become unusable and parts of the setup may have to be repeated. Additionally, any errors in the setup may not be easily detected.

Some of these above-noted challenges may be partially overcome by integrating the host servers and the shared storage (e.g., the SAN) in a standalone component. For example, the host servers may be individual blades in a chassis having integrated shared storage (e.g., the PowerEdge VRTX from Dell™). In some such examples, the blade servers and the shared storage are directly attached in accordance with the Serial Attached SCSI protocol. Implementing a virtual process control environment via blade servers in a chassis with integrated storage simplifies some of the complexity because the network structure between the blades, the shared storage, and network card locations are fixed. As such, certain configuration steps can be pre-configured by the OEM of the chassis. However, the host (blade) servers (including the associated network cards) and the shared storage still need to be configured for the particular application (e.g., process control system) in which they are to be implemented. As such, the configuration of such a virtual system still involves complexities that can lead to errors as described above.

Examples disclosed herein overcome these challenges by automating configuration choices that are redundant by enabling each such setting to be made once and applied throughout the system. For example, a typical SAN configuration involves entering a single parameter value (e.g., network card name) in multiple places on the same and/or across different hardware (e.g., in each host server and the SAN device). The examples disclosed herein enforce a common naming convention used by all servers in a cluster. Implementing a fixed naming convention in this manner helps avoid common sources of error such as, for example, typos and human oversight in the network card selection. In some examples, end users are presented with a dialog that allows them to assign fixed (e.g., predefined) labels, tags, or names to each physical network card and/or to assign names to individual network ports. In some examples, the fixed names are provided as default names corresponding to most common use cases of the control system appliance(s) being serviced by the host servers. In other examples, the end user may define the fixed names (e.g., to accommodate custom hardware configurations). In either case, the fixed names may be stored in a single configuration data structure or file (e.g., in a simple comma separate value (.CSV) file). Additionally, in some examples, the configuration data structure may also include IP information such as values defining IP addresses, subnet addresses, and/or Domain Name System (DNS) addresses (collectively referred to herein as IP information) for the different network cards and/or network ports associated with the different host servers. The configuration data structure/file with the fixed names included therein serves the purpose of an image that would be supplied by an OEM computer vendor. In some examples, the configuration data structure/file is pre-populated by the OEM and/or provided by a process control system vendor in a software package used to configure the hardware for implementation with a process control system.

In some examples, the configuration of the host servers and the shared storage is based on the values (e.g., names, IP information, etc.) in the configuration data structure/file. That is, in some examples, the configuration data structure/file is referenced throughout the configuration process of a virtual process control environment to ensure the same name is used in each appropriate instance. In this manner, there is no risk of names or values not matching. Furthermore, in some examples, the information contained in the configuration data structure/file is accessed automatically by a virtual network configuration system with little or no input from an end user, thereby greatly reducing the time, expense, and chance for error from a technician making configuration decisions while setting up the system.

Additionally, examples disclosed herein provide for the relatively fast configuration of virtual workstations in a process control system based on virtual machine templates that contain all the generalized settings for any desired type of workstation (e.g., operator station, historical data collection, etc.). Further, examples disclosed herein enable the discovery of entire process control system network connections to generate a visual schematic of the connections for reference (e.g., during troubleshooting). Further still, the discovery and generation of the network connections can be used to create a duplicate virtualized system for troubleshooting, simulation, training, and/or system migration. Additionally, the network discovery described herein is applicable to physical networks, thereby enabling the conversion of a physical control system to a virtual control system.

General background information regarding virtualization in the context of process control systems is provided in "DeltaV™ Virtualization" (Emerson Process Management, DeltaV Whitepaper, available at http://www2.emersonprocess.com/siteadmincenter/PM%20DeltaV%20 Documents/ Whitepapers/DV_WP_Virtualization.pdf, June 2014), and in "DeltaV™ Virtual Studio" (Emerson Process Management, DeltaV Product Data Sheet, available at http://www2.emersonprocess.com/siteadmincenter/PM%20DeltaV%20Documents/ProductDataSheets/PDS DeltaV Virtual Stud io.pdf, July 2014), both of which are hereby incorporated by reference in their entireties.

Turning in detail to the figures, FIG. 1 is a schematic illustration of an example process control system or DCS 100 within which the teachings of this disclosure may be implemented. As used herein, the phrase "process control system" is used interchangeably with the phrase "distributed control system" (DCS). The example DCS 100 of FIG. 1 includes process controllers 102 communicatively coupled to a plurality of smart and/or non-smart field devices 104 using any desired communication media (e.g., wireless, hardwired, etc.) and protocols (e.g., Foundation Fieldbus, Profibus, HART, etc.). The example controllers 102 of FIG. 1 may be, for example, a DeltaV™ controller sold by Fisher-Rosemount Systems, Inc., an Emerson Process Management company. While the teachings disclosed herein are described in connection with DeltaV™ hardware, software, and/or firmware, the teachings may be adapted for other hardware (e.g., other controllers), firmware, and/or software manufactured and/or developed by other entities. Further, while two controllers 102 are shown in FIG. 1, additional and/or fewer controllers and/or process control platforms of any desired type and/or combination of types could be implemented in the example DCS 100.

Typically, controllers in a process control system are communicatively coupled to one or more operator stations, application stations, and/or other workstations (collectively referred to herein as workstations) that may be associated with one or more computers. However, in the illustrated example, the controllers 102 are communicatively coupled to an example virtual process control environment 106. The example virtual process control environment 106 of FIG. 1 includes an example domain controller 108, an example first host sever 110, an example second host server 112, an example third host server 114, and an example storage area network (SAN) 116. In the illustrated example, the virtual process control environment 106 implements virtual machines corresponding to a plurality of virtual workstations 117 listed in the table 118.

As represented in the table 118, the virtual workstations 117 implemented for the DCS 100 include eight virtual operator stations 120, four virtual application stations 122, and one virtual primary control system application station 124 (e.g., a DeltaV™ ProPlus workstation). In particular, in the illustrated example, the first host server 110 implements three of the virtual operator stations 120 and two of the virtual application stations 122, the second host server 112 implements three other ones of the virtual operator stations 120 and one of the virtual application stations 122, and the third host server 114 implements the remaining two of the virtual operator stations 120, the final virtual application station 122, and the virtual primary control system application station 124. While an example division of the example virtual workstations is shown in the table 118, the example virtual workstations may be assigned to any one of the host servers 110, 112, 114 in any combination subject to the demands of each of the host servers 110, 112, 114. Additionally or alternatively, in some examples, duplicate copies of one or more of the virtual workstations may be implemented on separate ones of the host servers 110, 112, 114.

In the illustrated example, the host servers 110, 112, 114 and the SAN 116 are communicatively interconnected to form a network commonly referred to as a cluster. The domain controller 108 is in communication with and manages the cluster and controls access to information stored within the cluster. In the illustrated example, the SAN 116 serves as a common or shared storage (e.g., a cluster shared volume) to which each of the host servers 110, 112, 114 may perform read/write operations to the same logical unit of memory (e.g., the same logical unit number). In this manner, data associated with the implementation of the virtual workstations 117 is stored separate from the native hard drive within each host server 110, 112, 114 to provide high availability for the system. For example, if one of the host servers 110, 112, 114 fails, the virtual workstations 117 implemented by that host server may be started on one of the other host servers 110, 112, 114. In some examples, the SAN 116 is not included such that each host server 110, 112, 114 relies on its local hard drive.

In the illustrated example of FIG. 1, each of the host servers 110, 112, 114 (and the associated SAN 116) of the virtual process control environment 106 is communicatively coupled to the controllers 102 via a bus and/or local area network (LAN) 128, which is commonly referred to as an application control network (ACN). The example LAN 128 of FIG. 1 may be implemented using any desired communication medium and protocol. For example, the example LAN 128 may be based on a hardwired and/or a wireless Ethernet communication scheme. However, any other suitable communication medium(s) and/or protocol(s) could be used. Further, although a single LAN 128 is illustrated in FIG. 1, more than one LAN and/or other alternative pieces of communication hardware may be used to provide redundant communication paths between the example components of FIG. 1.

In some examples, the virtual process control environment 106 (e.g., the domain controller 108, the host servers 110, 112, 114, and the SAN 116) is communicatively coupled to thin clients 126 that can remotely access the virtual workstations 117 implemented within the virtual process control environment 106 to enable operators, engineers, and/or other plant personnel to interact with the workstations via a user interface rendered on a display of the thin clients 126 in the same manner as if the virtual workstations 117 were implemented with a physical computer system and/or other processor platform associated with the display. Thus, the example virtual process control environment 106 may operate and control the DCS 100 in a manner that would otherwise require thirteen different computer systems corresponding to each of the eight operator stations 120, four application stations 122, and the one primary control system application station 124. As such, the example virtual process control environment 106 implementing the workstations virtually may significantly reduce the hardware, installation, and maintenance costs of a more traditional (i.e., non-virtual) process control system. Furthermore, less hardware also reduces certain operational costs, such as, for example, power consumption and cooling of computer equipment.

Implementing the example DCS 100 as illustrated in FIG. 1 with the example virtual process control environment 106 can improve hardware utilization while reducing the footprint of the system. The example virtual process control environment 106 also provides increased flexibility in developing and/or operating the system. For example, virtualization enables the addition or removal of virtual workstations with relative ease as when, for example, different scenarios are to be developed for training purposes. Further, the example DCS 100 with the virtual process control environment 106 enables the support of different systems using different versions of software because the software and hardware are independent. In the same manner, the virtual process control environment 106 allows for the update of software and hardware independently without concern of the former being supported by the latter.

In some examples, the virtual process control environment 106 (i.e., the separate domain controller 108, host servers 110, 112, 114, and SAN 116) may be replaced and/or implemented via a different virtual process control environment 130 based on an integrated server and storage solution. As shown in the illustrated example, the virtual process control environment 130 includes three host servers 132, 134, 136 implemented as blade servers in a chassis with an integrated shared storage 138. As represented in the illustrated example, the virtual process control environment 130 may replace the virtual process control environment 106 to provide the same functionality as described above to implement the virtual workstations 117 and communicatively couple them to the process controllers 102 and the rest of the DCS 100. However, the configuration and internal operation of the virtual process control environment 130 may be different than the virtual process control environment 106. For example, with the SAN 116 being separate from the host servers 110, 112, 114, such components may be communicatively interconnected using the Internet Small Computer System Interface (iSCSI) protocol. By contrast, because the chassis 138 includes an integrated storage (e.g., a SAN), the host servers 132, 134, 136, in some examples, are directly attached via the Serial Attached SCSI (SAS) protocol. The integration of the shared storage and host servers in a single chassis of the virtual process control environment 130 may provide additional cost savings and a smaller footprint than the virtual process control environment 106. Further, because the shared storage is integrated in the chassis 138 with the host servers 132, 134, 136 some of the wiring and configuration that would otherwise need to be completed by an end user may be accomplished by an OEM of the chassis.

While two example virtual process control environments 106, 130 have been described, other implementations and/or variations may also be employed. For example, host servers may be implemented with a fiber attached storage or an externally attached SAS storage (as opposed to directly attached as described above). Furthermore, for purposes of explanation, examples disclosed herein are described with respect to the virtual process control environment 106 but apply equally to the virtual process control environment 130 unless indicated otherwise.

While FIG. 1 illustrates an example DCS 100 within which the teachings disclosed herein may be advantageously employed, the teachings disclosed herein may, if desired, be advantageously employed in other process plants and/or process control systems of greater or less complexity (e.g., having more than one virtual process control environment 106, having more workstations (physical and/or virtual), across more than one geographic location, etc.) than the illustrated example of FIG. 1.

As described more fully below, the examples disclosed herein automate the setup and configuration of a virtual process control environment, such as the example virtual process control environments 106, 130 of FIG. 1, in a process control system, such as the example DCS 100 of FIG. 1. To implement the teachings disclosed herein it is assumed that all hardware setup for the system is complete, up to, but not including, verification of which specific network card (e.g., of the host servers 110, 112, 114) is tied to which network. That is, the domain controller 108, the host servers 110, 112, 114, and the SAN 116 are assumed to be properly connected (though not configured) to communicate with each other but the connections (e.g., via Ethernet cables) from the controllers 102 and field devices 104 of the DCS 100 have not yet been coupled to the host servers 110, 112, 114. Further, it is assumed that the domain controller 108 is properly coupled to the host servers 110, 112, 114 and SAN 116 to receive requests from each of the host servers 110, 112, 114 and SAN 116 to join the domain. Likewise, with respect to the virtual process control environment 130 it is assumed that the host servers 132, 134, 136 are properly connected in the chassis 138 to communicate with each other, the integrated storage and associated domain server. Further, the teachings disclosed herein begin after an operating system and all drivers for the network cards have been installed on each of the host servers 110, 112, 114.

Figure 2:
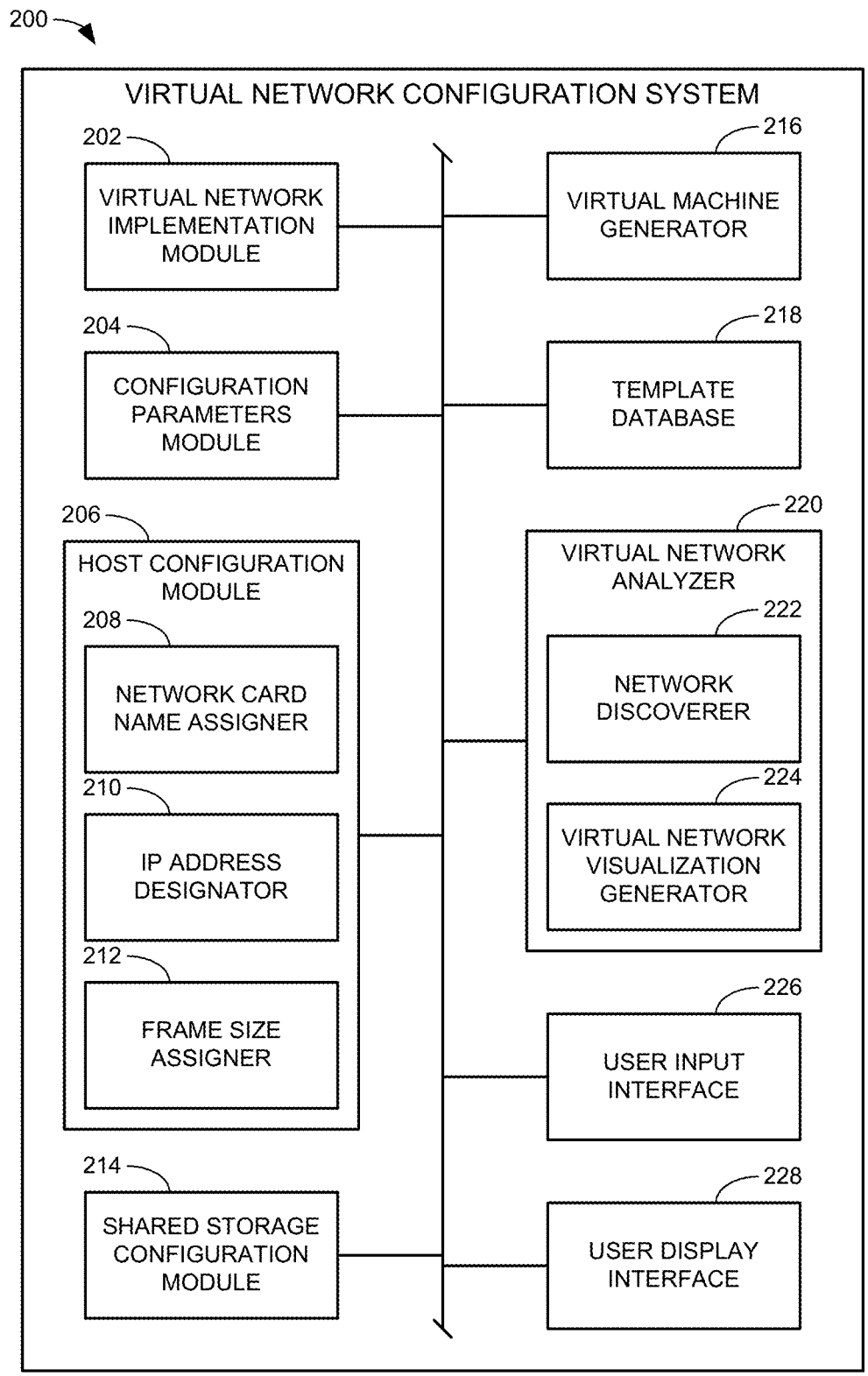
FIG. 2 is block diagram of an example virtual network configuration system to configure the virtual process control environment of FIG. 1.

FIG. 2 is block diagram of an example virtual network configuration system 200 constructed in accordance with the teachings disclosed herein to configure the virtual process control environments 106, 130 of FIG. 1. The example virtual network configuration system 200 includes an example virtual network implementation module 202; an example configuration parameters module 204; an example host configuration module 206 that includes an example network card name assigner 208, an example IP address designator 210, and an example frame size assigner 212; an example shared storage configuration module 214; an example virtual machine generator 216; an example template database 218; an example virtual network analyzer 220 that includes an example network discoverer 222 and an example virtual network visualization generator 224; an example user input interface 226; and an example user display interface 228.

In the illustrated example of FIG. 2, the virtual network configuration system 200 is provided with the example virtual network implementation module 202 to oversee the operation of different portions of the virtual network configuration system 200. For example, the virtual network implementation module 202 may communicate instructions or commands to other portions of the example virtual network configuration system 200 to control the operations of those portions. In some examples, the virtual network implementation module 202 determines the procedures or type of configuration to be conducted based on the nature of the virtual process control environment. That is, the configuration procedures followed may vary depending on whether the virtual process control environment is implemented using multiple host servers with a separate storage area network (e.g., the virtual process control environment 106 of FIG. 1) or whether the virtual process control environment is implemented using a chassis with integrated shared storage (e.g., the virtual process control environment 130 of FIG. 1).

Figure 3:
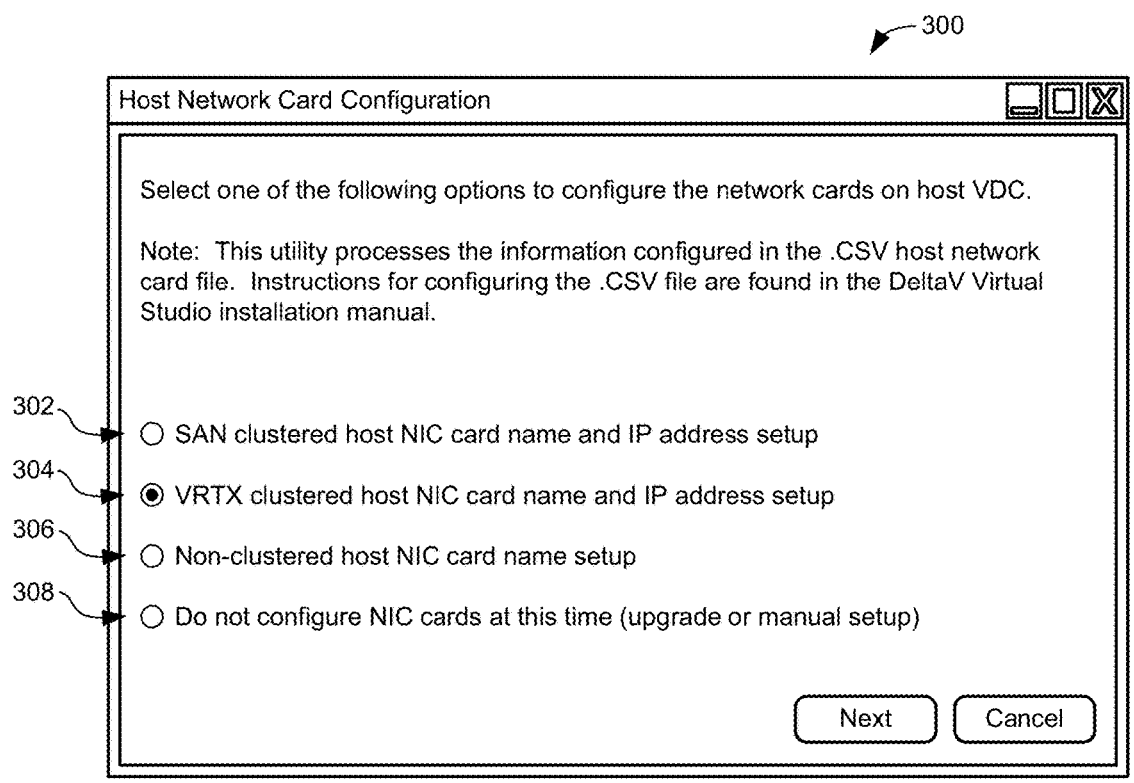
FIG. 3 is an example configuration dialogue used in connection with the example virtual network configuration system of FIG. 2.

In some examples, virtual network implementation module 202 determines the configuration procedures based on user feedback entered into a dialogue displayed via the user display interface 228. An example dialogue 300 to obtain such feedback is illustrated in FIG. 3. As shown in the illustrated example, the dialogue 300 provides a user four different options. A first option 302 may be selected to configure host servers (and their associated network cards) communicatively coupled to a SAN (e.g., the hosts 110, 112, 114 and the SAN 116 of the virtual process control environment 106 of FIG. 1). A second option 304 may be selected to configure host servers (and their associated network cards) in a chassis with an integrated shared storage (e.g., the hosts 110, 112, 114 and the SAN 116 of the virtual process control environment 106 of FIG. 1). A third option 306 may be selected to configure host servers (and their associated network cards) that are not configured in a cluster and, thus, not associated with a storage area network (SAN). A fourth option 308 may be selected if a user desires to manually setup the host servers and/or the user merely desires to perform an upgrade (e.g., the host servers are already configured). The manner in which the virtual process control environment is configured depends upon which option 302, 304, 306, 308 a user selects. Example methods or procedures to configure a virtual process control environment based on the first two options are described more fully below. However, the teachings described herein may also be adapted to configure non-clustered host servers (e.g., the third option 306) and/or other configurations not represented in the example dialogue of FIG. 3 (e.g., a chassis with external SAS storage, a fiber network, etc.).

Figure 4:
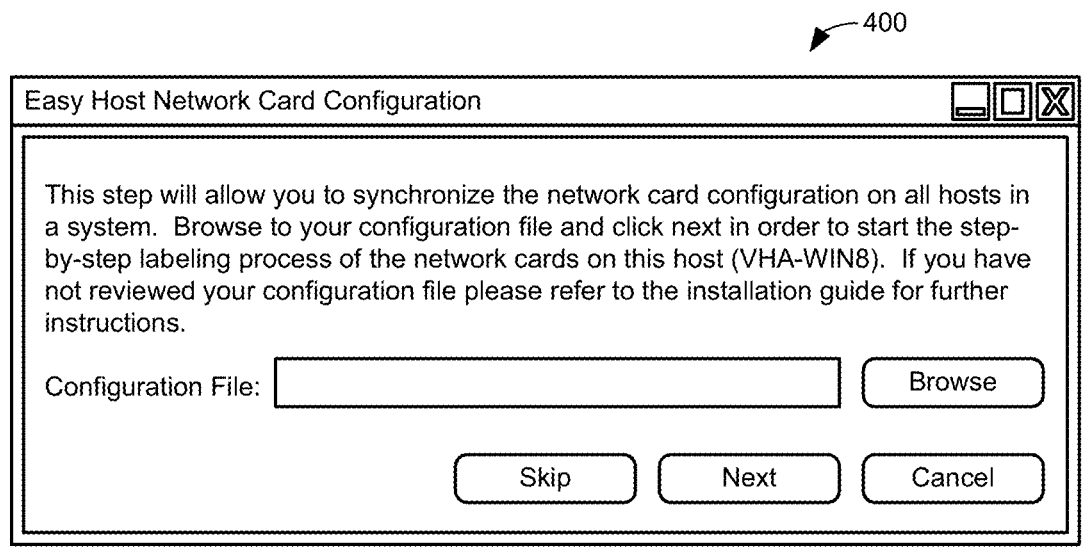
FIG. 4 is an example configuration data structure dialogue used in connection with the virtual network configuration system of FIG. 2.

Returning to FIG. 2, the virtual network configuration system 200 is provided with the example configuration parameters module 204 to generate, store, and/or manage a configuration parameters data structure and/or file containing information and/or parameters used during the configuration of the virtual process control environments 106, 130. In some examples, the configuration data structure/file is a comma-separated value (.CSV) file containing a list of parameters and associated values used during the configuration process. Such a configuration data file may be used to configure the virtual process control environment 106 that includes the separate SAN 116. In some such examples, the configuration data file may be generated by a user and then imported by the configuration parameters module 204 (e.g., upon identification of a file path to the configuration data file as shown in an example dialogue 400 of FIG. 4. In some examples, the configuration data file may be pre-populated with parameter values provided by a developer of the virtual network configuration system 200 that may be imported via the dialogue 400 or automatically provided during the configuration process. In some examples, where the connections and relationships between the host servers and the shared storage are known (e.g., the integrated storage in the virtual process control environment 130), the configuration data structures may be in a format other than a .CSV file that is integrated in the pre-loaded software by the original equipment manufacturer and/or vendor. In some examples, the configuration data structure is generated by the example configuration parameters module 204 during the configuration process of a host server. In some such examples, a user may insert, change, and/or add values for parameters in the configuration data structure during the process.

FIGS. 5A and 5B illustrate example configuration data structures or files 500, 502 represented as tables. As described above, the virtual process control environment 106 may be implemented with or without a shared storage (e.g., with or without a cluster). Accordingly, the example configuration data structure 500 of FIG. 5A corresponds to settings for a non-clustered system (e.g., the third option 306 shown in FIG. 3), whereas the configuration data structure 502 of FIG. 5B corresponds to settings for a system that includes a SAN whether external (e.g., the first option of FIG. 3) or integrated in a chassis with the host servers (e.g., the second option of FIG. 3).

In the illustrated examples, both of the configuration data structures 500, 502 include a first row 504 that provides names or labels for each of the host servers 110, 112, 114. For example, a first name 506 ("VHOST1") may correspond to the first host server 110, a second name 508 ("VHOST2") may correspond to the second host server 112, and a third name 510 ("VHOST3") may correspond to the third host server 114. In some examples, the names 506, 508, 510 are provided in the configuration data structures 500, 502 by default from the manufacturer and/or vendor. However, in some examples, a user may edit the configuration data structures 500, 502 to appropriately change the name for the host servers 110, 112, 114 (e.g., if the host servers are already associated with a different name). Additionally, in some examples, more or fewer names may be included in the configuration data structure (e.g., by default and/or added/removed by an end user) to correspond to the appropriate number of host servers to be configured in the system.

In the illustrated examples, both of the configuration data structures 500, 502 include a network card name setup section 512 that includes a list of configuration names 514 that may be assigned to specific network cards and/or network ports associated with the host servers. In some examples, the list of configuration names 514 included in the network card name setup section 512 are provided in the configuration data structures 500, 502 by default from a manufacturer and/or vendor based on most common use cases for process control systems. For example, the list of configuration names 514 shown in the illustrated examples correspond to the common names in many DeltaV™ process control systems. Accordingly, many end users will be able to rely on the configuration data structure 500, 502 provided without any need for changes or customization. Additionally, although the network card names 514 may be provided by default, in some examples, an end user may edit, add, or delete names within the network card name setup section 512 of the configuration data structures 500, 502.

In contrast to the example configuration data structure 500 of FIG. 5A, the example configuration data structure 502 of FIG. 5B also includes a cluster setup section 516 that contains relevant information to configure the SAN 116. In particular, the example cluster setup section 516 provides a list of configuration names 518 to be assigned to network cards and/or specific network ports. Additionally, as shown in the illustrated example of FIG. 5B, next to each name in the list of configuration names 518 in the configuration data structure 502, is IP information 520 (e.g., IP addresses, Subnet addresses, or DNS addresses). As shown in the illustrated example, the IP information 520 provides IP values for each of the network ports (identified by the configuration names 518) corresponding to each of the hosts (identified by the host names 506, 508, 510). In the illustrated example, the list of configuration names 518 is fixed while the associated IP information 520 are provided as default values (e.g., by the manufacturer and/or vendor). That is, while an end user cannot change the list of configuration names 518, the associated IP information 520 may be edited by an end user as needed. More generally, all parameters in the configuration data structures 500, 502 that are shaded may be changed by a user.

Returning to FIG. 2, in some examples, the configuration parameters module 204 checks the configuration data structures 500, 502 for errors (e.g., if generated by the end user). Further, in some examples, the configuration parameters module 204 enforces the naming convention designated by the configuration data structure. More particularly, in some examples, the configuration parameters module 204 limits a user to naming host servers, network cards, and/or network ports according to the names provided in the configuration data structures 500, 502 to ensure consistent names and values are applied throughout the configuration process. That is, during the configuration process a user is provided a list of configuration names (which may include both lists 514, 518) from which the user may select a name for a particular network card to be named. Thus, if the user desires to assign a network card with a name other than what is provided in the configuration data structure, the user first changes the configuration data structure. In some examples, changes to the configuration data structures are performed before beginning the configuration process. In other examples, a user may make a change to a particular parameter in the configuration data structure during the configuration process. In such examples, the configuration parameters module 204 confirms the change is not inconsistent with already configured parameters and then updates the data structure so that the changes become available for all future instances of the particular name or value change. In this manner, every instance of the desired name or value is maintained constant, thereby substantially reducing the risk of the user making an error during set up by changing the parameter of one of the network cards in one location (e.g., associated with a first host server) without changing (or incorrectly spelling) the parameter in another location (e.g., when configuring a corresponding network card associated with another host server).

In the illustrated example of FIG. 2, the virtual network configuration system 200 is provided with the example host configuration module 206 to configure the host servers 110, 112, 114. As shown in the illustrated example, the host configuration module 206 includes the example network card name assigner 208, the example IP address designator 210, the example frame size designator 212. In some examples, the network card name assigner 208 functions in conjunction with the configuration parameters module 204 to assign names to the network cards and/or network ports associated with each of the host servers 110, 112, 114 being configured by the host configuration module 206. In some examples, the card name assigner 208 generates a network card configuration dialogue that provides a list of current names (e.g., manufacturer default names) for each of the network cards and/or ports associated with a particular host server. Additionally, in some examples, the network card configuration dialogue includes the list of configuration names from which new names for the network cards and/or ports can be selected and then assigned. In some examples, the list of configuration names provided by the network card name assigner 208 corresponds to the lists of configuration names 514, 518 in the configuration data structures 500, 502.

Figure 6:
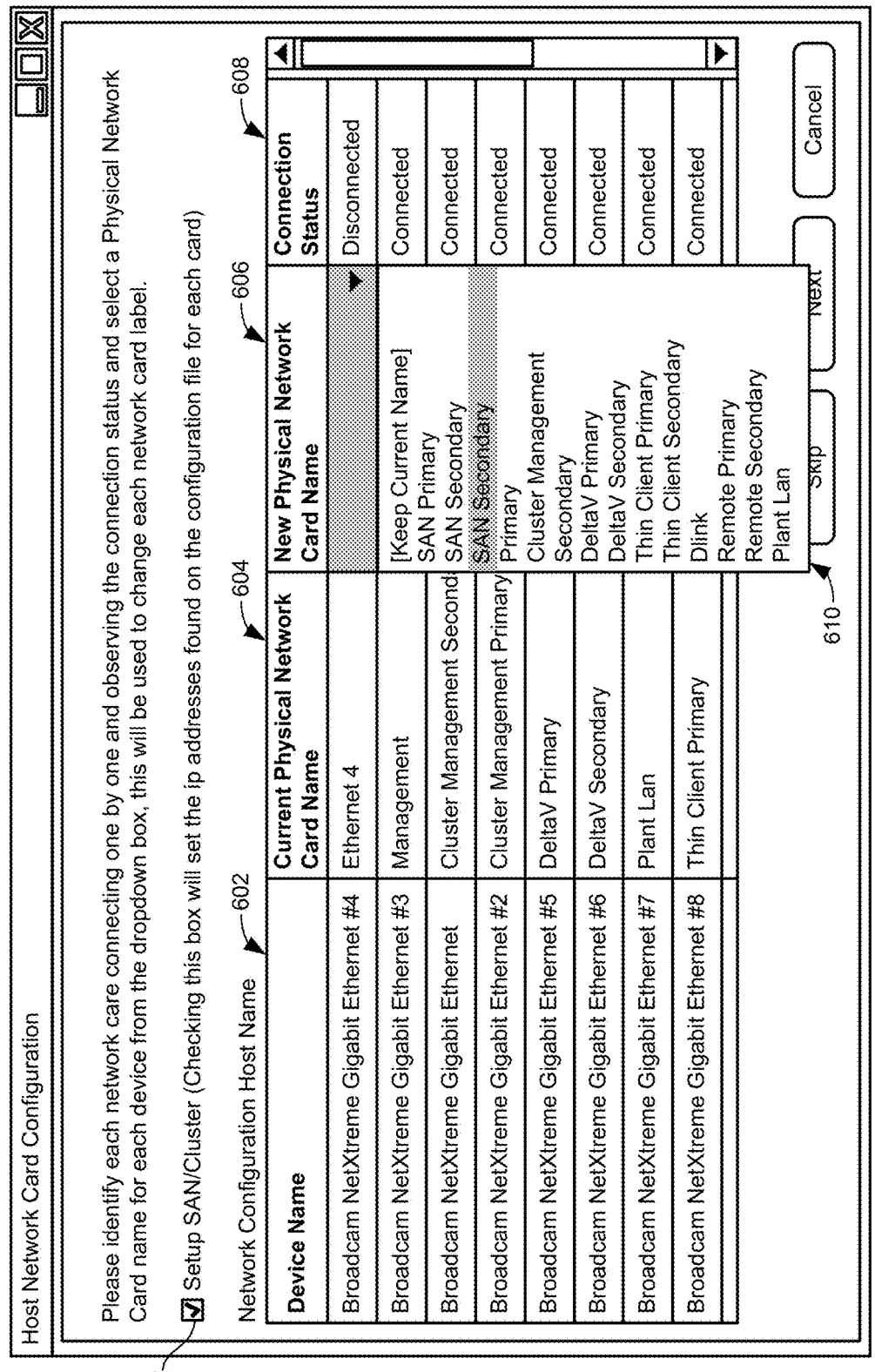
FIG. 6 is an example network card configuration dialogue used in connection with the example virtual network configuration system of FIG. 2.

An example network card configuration dialogue 600 is illustrated in FIG. 6. The example network card configuration dialogue 600 includes four columns including a device name column 602, a current name column 604, a new name column 606, and a connection status column 608. In some examples, the device name column 602 identifies the device name of each network card associated with the host server being set up. Often, as shown in FIG. 6, the device names for the network cards are non-descriptive and arbitrary within the host server. Further, because the device names are arbitrary, the device name for a network card associated with a first host server will not necessarily be the same as the device name given to the corresponding physical network card associated with a different host server. That is, the original device names for network cards on different servers do not always match up and, therefore, cannot be relied on to identify corresponding network cards. As a result, in many instances, this arbitrary naming of network cards gives rise to confusion and is a source of potential error in setting up a virtual process control system such as the DCS 100 of FIG. 1.

In some examples, the current name column 604 identifies the currently assigned name, label, or tag associated with each network card of the host server being set up as stored in the memory of the host server. In some examples, when new hardware is initially being configured, the current physical network card name may correspond to the arbitrary and/or non-descriptive device name of the network card (e.g., as shown in the first column of device names 602 in FIG. 6) such that the initial physical network card name does not assist an engineer in properly configuring the network cards.

This confusion and potential for error is overcome in the disclosed examples by renaming the network cards using predefined or fixed names provided in the configuration data structures 500, 502. In particular, as shown in the illustrated example of FIG. 6, the new name column 606 includes a drop down menu 610 for each network card containing each of the names in the list of configuration names in the configuration data structure as described above in connection with FIGS. 5A and 5B. By providing the names from the configuration data structure in a drop down menu, the user is limited in assigning each network card to one of the names already defined by the configuration data structure. As such, the potential for inadvertent name changes (e.g., through typos and/or through the engineer forgetting what name was assigned in a previously configured host server) may be reduced.

However, the fixed names in the configuration data structures 500, 502 are only helpful to an engineer if the engineer knows which name to pick for each particular network card to be renamed. This obstacle is overcome in the illustrated example of FIG. 6, through the connection status column 608, which provides an indication of the connection status of the network port(s) associated with the particular network card. More particularly, the connection status column 608 provides a connection status indicator that switches from "Disconnected" to "Connected" when an Ethernet cable is plugged into the network card. Thus, if an engineer knows what network a particular cable is associated with when the engineer plugs it into a network card, by observing the change in the connection status indicator in the connection status column 608, the engineer can then select the correspond configuration name associated with the network to which the network card was just connected. For example, when an engineer is connecting wires to the host servers the cables are typically physically labeled or otherwise identifiable by the engineer (e.g., ringing out the wires). As such, as the engineer inserts one cable into a port of the host server, the connection status of one network card will change to indicate it is connected. By identifying this change, the engineer can select the proper name for the network card based on the known source of the wire being connected as indicated by the identification of the wire that was just plugged in. In this manner, the effort and time needed to keep track of wires and properly identify ports in each host server is significantly reduced. In some examples, the network card configuration dialogue 600 is refreshed periodically (e.g., every 5 seconds) to maintain the connection status indicators up to date.

In some examples, the network card configuration dialogue 600 includes a user selectable checkbox 612 to indicate whether an end user desires to setup the IP addresses and related information for the storage area network. In some examples, if the checkbox 612 is checked the example IP address designator 210 will retrieve the IP information from the configuration data structure and assign it to the corresponding network ports of the corresponding host servers. In some examples, where the checkbox 612 is not checked, the network card name assigner 208 assigns the network car and/or port but the corresponding IP information is not set up. In some examples, where the configuration data structure does not include a SAN, the checkbox 612 may be grayed out or otherwise unavailable to the user.

Figure 7:
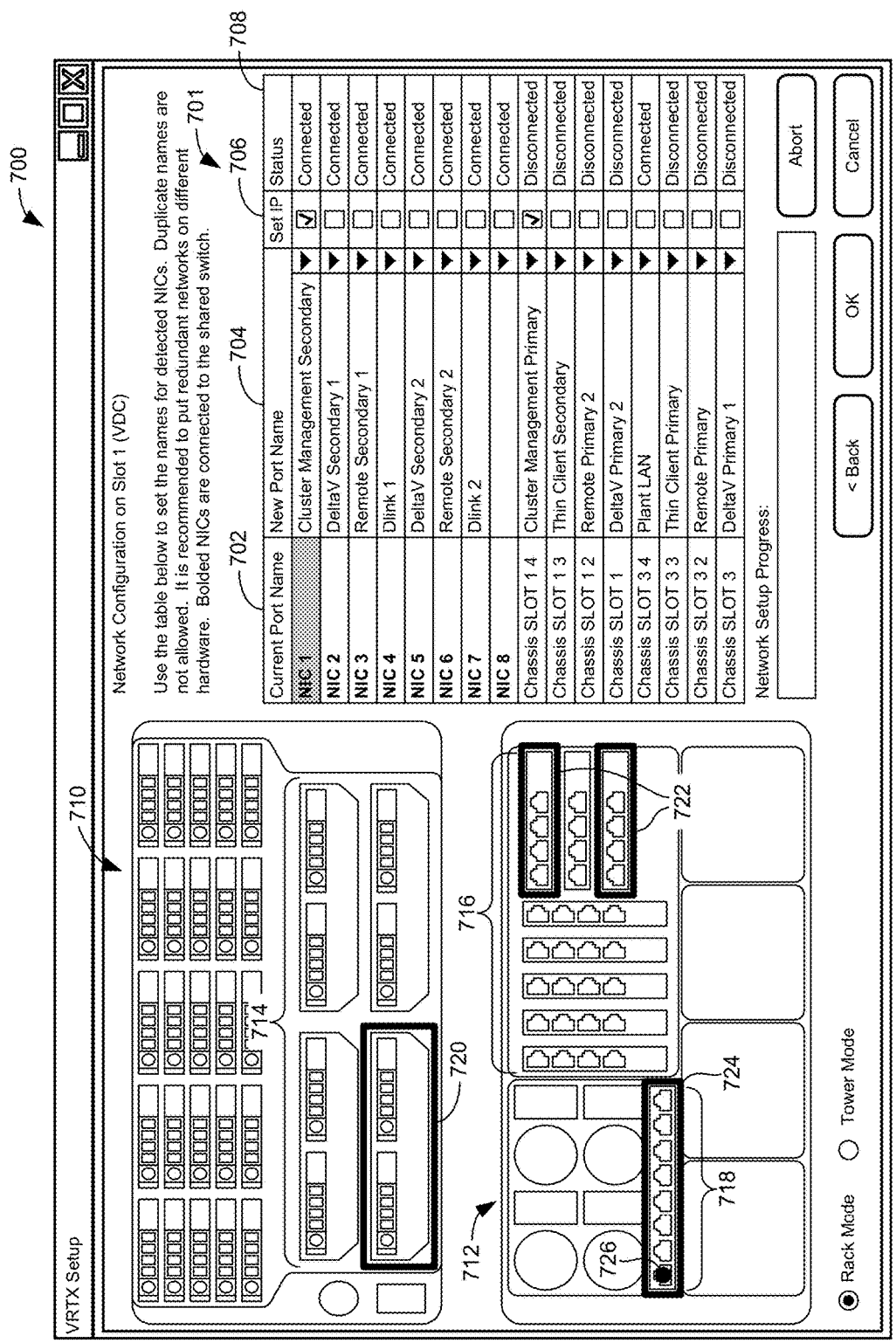
FIGS. 7 and 8 are example network card configuration dialogues used in connection with the example virtual network configuration system of FIG. 2.

Another example network card configuration dialogue 700 is shown in the example of FIG. 7. The example network card configuration dialogue 700 includes a table 701 that has a current port name column 702, a new port name column 704, an IP configuration column 706, and a connection status column 708. The example network card configuration dialogue 700 of FIG. 7 is adapted for configuring a virtual process control environment implemented via host servers in a chassis with an integrated shared storage (e.g., the virtual process control environment 130 of FIG. 1). Accordingly, the current port name column 702 contains the current name for each of the network ports on the chassis 138 and associated with the host servers 132, 134, 136. The new port name column 704 includes an identification of the name to which the corresponding port is to be reassigned once a user completed the dialogue 700. In the illustrated example, each name in the new port name column 704 corresponds to a name from the list of configuration names in the configuration data structure similar to the example network card configuration dialogue 600 described above.

However, unlike in FIG. 6, the example network card configuration dialogue 700 provides a visual indication of the physical network port corresponding to each of the current port names listed without the need for an engineer to ring out and plug in one wire at a time and observe the connection status indicator change. More particularly, the example network card configuration dialogue 700 of FIG. 7 includes a graphical representation of the front 710 and back 712 of the chassis 138 that shows the location of four server slots 714 (to carry the host servers 132, 134, 136), the location of eight network cards 716 (two being associated with each slot 714), as well as the location of eight shared switches 718. Because the virtual process control environment 130 is an integrated system, the internal network connections between the server slots 714 are known. Accordingly, in the illustrated example, the location of the current host server being configured (e.g., the location of the server slot 714) is visually identified on the front 710 of the graphical representation of the chassis 138 by, for example, a box 720 around the corresponding slot 714. In other examples, other visual indications may additionally or alternatively be used. In some examples, corresponding boxes 722 are rendered around the network cards associated with the particular host server as well as a box 724 around the shared switches 718 available to the host server. In this manner, the specific host server and associated network ports are easily identifiable to a user for easily referencing while plugging in cables. Furthermore, in some examples, if a user selects a particular network port listed in the table 701, another visual indicator (e.g., a colored dot 726) is rendered in the graphical representation of the chassis 138 to specifically identify the location of the selected network port. For example, as shown, the first network port is selected and corresponds to the first (NIC 1) of the shared switches 718. Accordingly, the colored dot 726 is rendered on top of the first shared switch in the graphical representation of the chassis 138.

Figure 8:
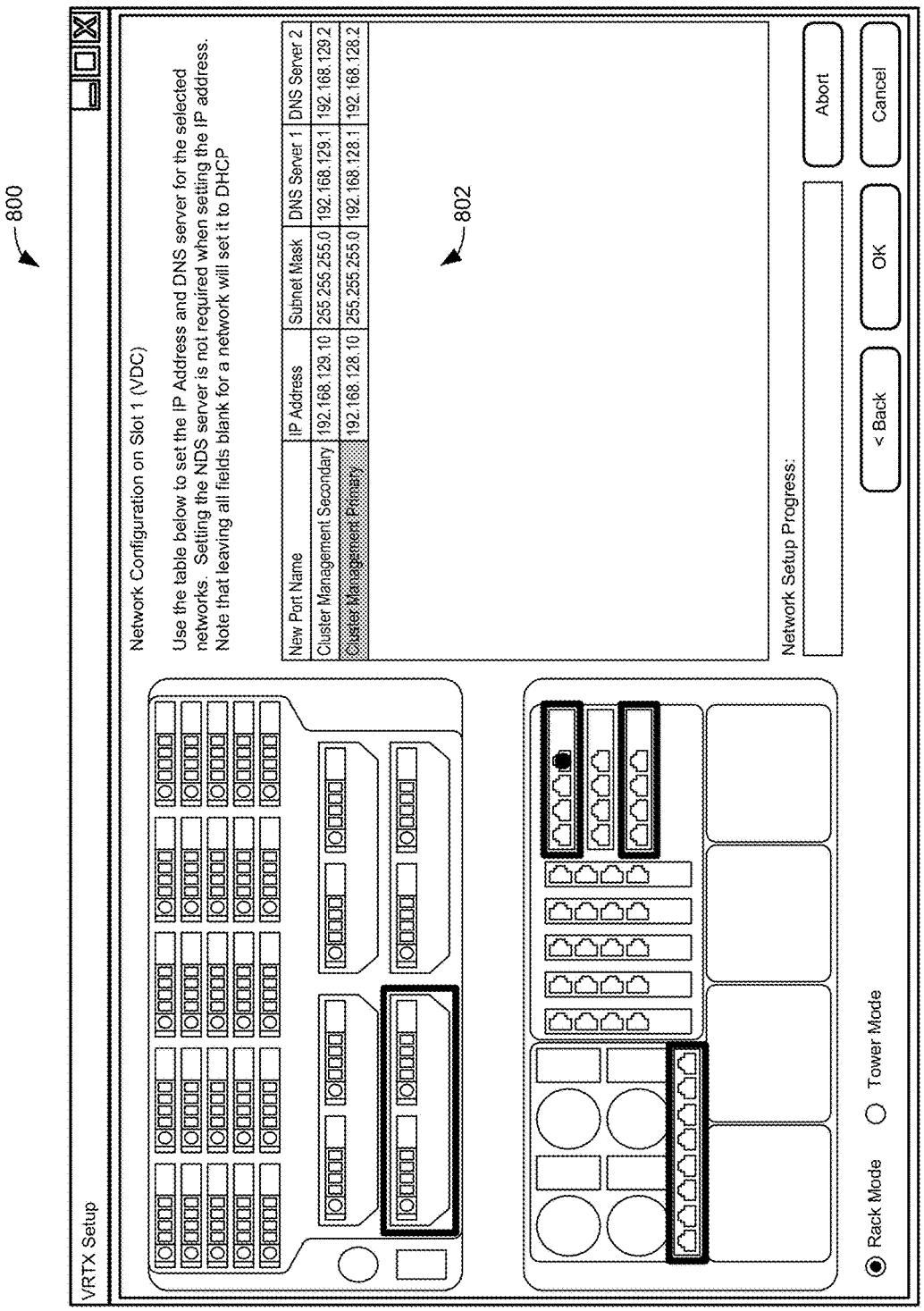

In the illustrated example of FIG. 7, the IP configuration column 706 includes a checkbox for each network port for a user to check if the user desires to configure the IP information for the selected network port(s). If any of the checkboxes are checked, when the user clicks OK, a second network card configuration dialogue 800 is provided as shown in FIG. 8. As shown in the illustrated example of FIG. 8, the network card configuration dialogue 800 includes a table 802 listing each of the network ports selected in the IP configuration column 706 of the example network card configuration dialogue 700 of FIG. 7. Additionally, the network card configuration dialogue 800 includes the IP information assigned to the network ports. In some examples, the IP information populated in the table 802 is taken from the values in the configuration data structure described above. Thus, by generating the configuration data structure as described above, the configuration and set up of host servers can be greatly facilitated and reduces the risk of errors by technicians because they do not need to enter or copy over any values from one location to another. As shown in the illustrated example, the same visual indications (e.g., the boxes 720, 722, 724 and the dot 726) shown in the example network card configuration dialogue 700 of FIG. 7 are provided in the example network card configuration dialogue 800 of FIG. 8.

Returning to the illustrated example of FIG. 2, the example host configuration module 206 includes the example frame size assigner to configure the frame size for each of the network ports of each host. In particular, in some examples, the network ports corresponding to the SAN primary network and the SAN secondary network (as identified by the corresponding configuration name assigned to the ports by the network card name assigner 208) are automatically configured provide communications using jumbo frames. In this manner, the overhead needed to send and receive the significant amount of data via the SAN when implementing a virtual process control system is greatly reduced.

Figure 9:
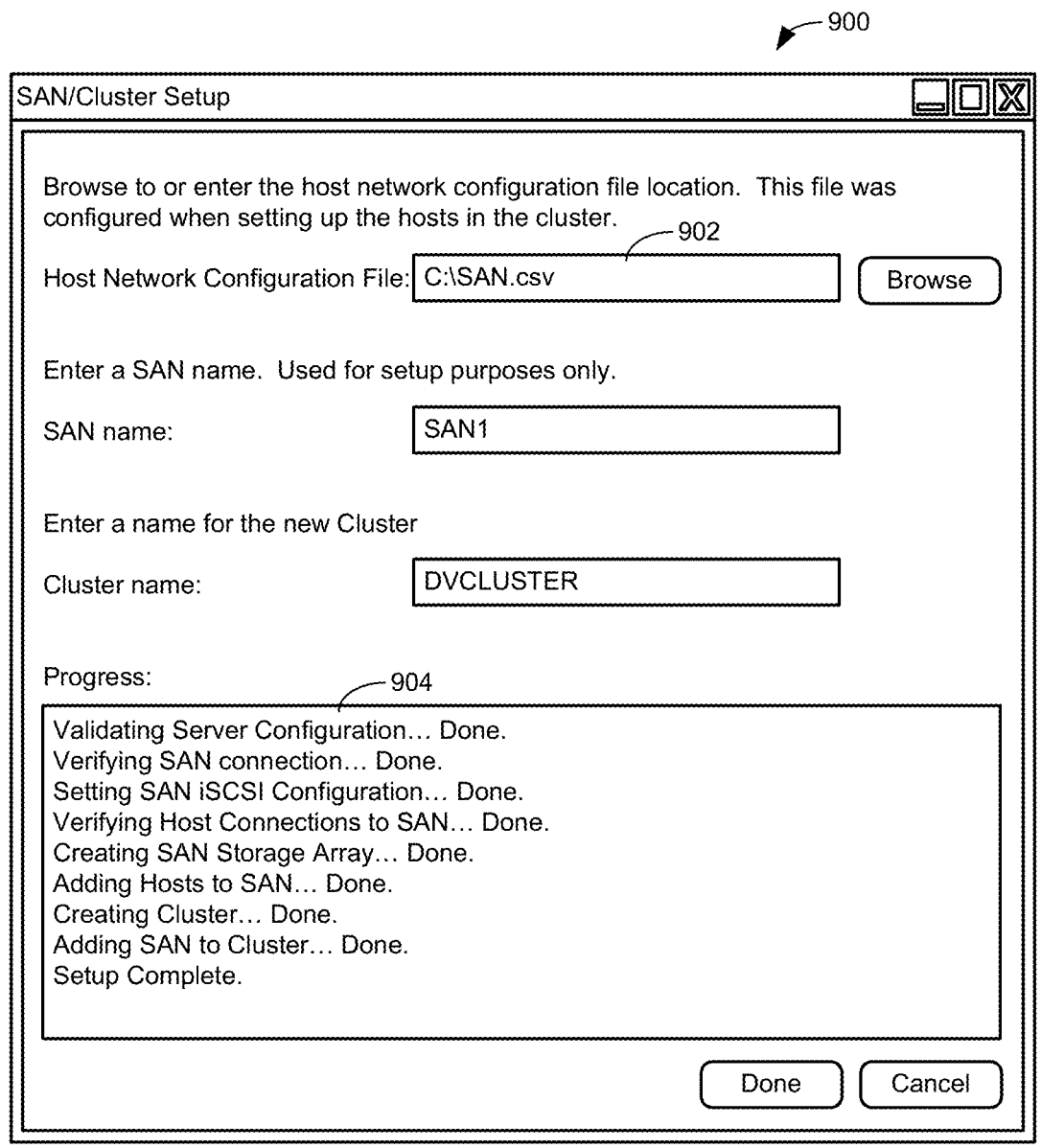
FIG. 9 is an example SAN configuration dialogue used in connection with the example virtual network configuration system of FIG. 2.
Figure 10:
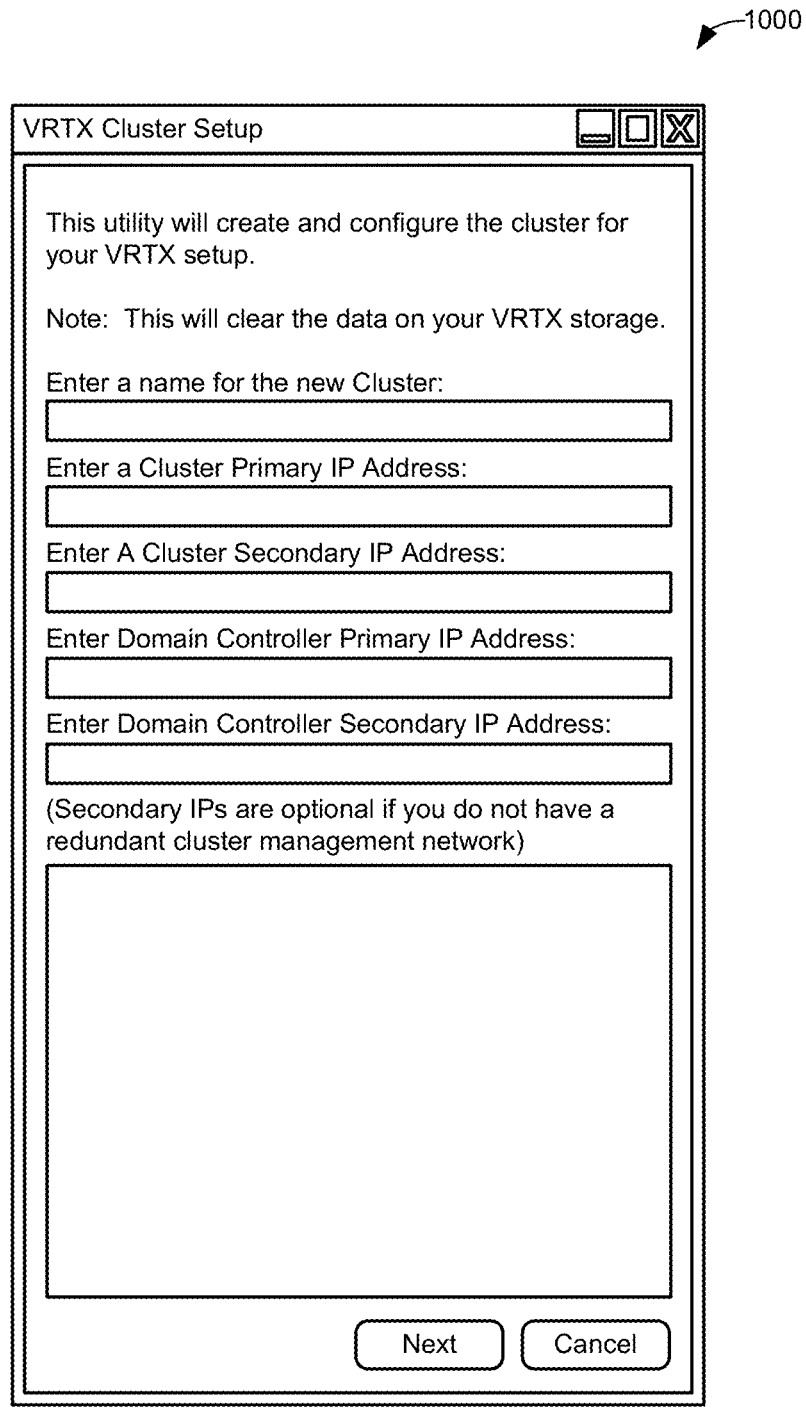
FIG. 10 is an example network card configuration dialogue used in connection with the example virtual network configuration system of FIG. 2.

In the illustrated example of FIG. 2, the virtual network configuration system 200 is provided with the example shared storage configuration module 214 to configure the SAN 116. In particular, in some examples, the shared storage configuration module 214 accomplishes the SAN configuration based on information in the configuration data structure used to configure the host servers 110, 112, 114 as well as additional information provided by a user. FIG. 9 illustrates an example SAN configuration dialogue 900 that may be generated by the shared storage configuration module 214 to obtain the needed information. As shown in the illustrated example, the SAN configuration dialogue 900 includes an input box 902 where a user identifies the location (e.g., file path) of the configuration data structure (e.g., a .CSV file). In some examples, the example SAN configuration dialogue 900 is displayed automatically following the completion of the network card configuration dialogue 600 of FIG. 6 if the checkbox 612 is checked. In such examples, a file path to the configuration data structure may be automatically filled in the input box 902. In some examples, if the host servers 110, 112, 114 have previously been configured, the SAN configuration dialogue 900 may be opened manually by a user. In such examples, the user may input (e.g., by browsing) the file path for the configuration data structure into the input box 902. In other examples, the shared storage configuration module 214 automatically retrieves the configuration data structure from the configuration parameters module 204. In some examples, the progress of the example configuration process is represented in the SAN configuration dialogue 900 in a progress box 904 as shown in FIG. 9. With respect to the virtual process control environment 130 (e.g., the host servers 132, 134, 136 in a chassis 138 with integrated shared storage), an example cluster configuration dialogue 1000 is illustrated in FIG. 10 to collect specific parameter names as part of the configuration process in addition to the information contained in the configuration data structure 500, 502.

Returning to the illustrated example of FIG. 2, the virtual network configuration system 200 is provided with the example virtual machine generator 216 to create or generate virtual machines (e.g., virtual workstations 117 of FIG. 1) for implementation by the virtual process control environment 106. In some examples, the creation of virtual workstations is facilitated by predefined virtual machine templates associated with the DeltaV™ software stored in the template database 218. A virtual machine template is a virtual machine with the operating system and DeltaV™ software fully installed but that has been generalized or abstracted by the removal of specific DeltaV™ and network configuration information. In this manner, the template integrates process control (e.g., DeltaV™) components but allows for the use and reuse of the template in different settings based on how the control and network specific information is defined. Templates may be provided to users corresponding to operator stations, professional stations, maintenance stations, application stations, zone servers, and terminal servers. Such templates may include DeltaV™ software pre-installed and network connections predefined such that a user merely has to select the desired template, assign the location (e.g., the host) within the virtual process control environment 106 where the virtual machine is to reside, and provide the necessary configuration specifics for the workstation. In some examples, the naming convention of virtual components of the virtual machine (e.g., virtual network ports) is based on the names in the list of configuration names in the configuration data structure used to initially set up the virtual process control environment 106. In the illustrated example, the virtual machine generator 216 obtains application specific data from a user and combines it with a virtual machine template to generate a particular virtual machine.

An example virtual machine creation dialogue 1100 generated by the virtual machine generator 216 is shown in FIG. 11, which illustrates the information to be entered by a user. From this limited information and the preconfigured template, a fully functioning and connected virtual workstation can be created. Furthermore, in some examples, templates for virtual controllers may also be provided to create virtual control systems for simulation and training purposes. An advantage of developing virtual process control environments based on such templates is that the templates, as fully configured virtual machines (e.g., including the installation of the control system software and all drivers), are completely independent of hardware. As such, the templates can be tested ahead of time by the control system software developer so that an end user can be confident in the operability and functionality of the resulting virtual machine regardless of the hardware used by the end user.

In the illustrated example of FIG. 2, the virtual network configuration system 200 is provided with the example virtual network analyzer 220 to analyze or discover the connections of a process control system network for purposes of visualization and/or duplication. As shown in the illustrated example, the virtual network analyzer 220 includes the example network discoverer 222 and the example virtual network visualization generator 224. The example network discoverer 222 is configured to crawl through a process control system network to identify the logical and/or physical connections between different components, thereby mapping out the process control system. In the context of a virtual process control system, the network discovery process involves going through each partition to identify virtual network adapters and physical network adapters (e.g., associated with the physical host servers) and to identify the virtual switches interconnecting the two as well as the nature of the connections. In some examples, the network discoverer 222 generates an extensible markup language (XML) file defining the discovered network.

Generating an XML file that describes an entire virtualized system can help in the technical support and/or diagnosis of errors in the system. For example, if there are problems with an existing process control system, an XML file can be created to capture the entire network system setup and which can then be virtually reproduced or cloned offsite by a technical support entity for troubleshooting and/or debugging. Additionally, duplicating a process control system can be helpful for simulations and/or operator training systems. In some examples, the cloning of a virtual system as described herein allows engineers to validate whether there are no differences in functionality between old and new systems. The example virtual network analyzer 220 also enables the streamlining of the migration process when updating underlying virtualization software. For example, using the teachings disclosed herein, an XML file representative of an existing network system setup can be exported to a different space, a new version of the underlying virtualization software can be installed, and the XML file can be imported to automatically set up the same network system on the new underlying software.

Beyond virtual process control system networks, in some examples, the network discoverer 222 may be adapted to discover a network of physical workstations in a physically implemented process control system. From the resulting XML file, a fully configured virtual system that duplicates the physical system can be automatically generated. Through this process, a physical system can be readily converted to a virtualized system without having to take the time and expense of creating individual virtual machines for each workstation and configuring the entire system because everything is already contained within the XML file generated through the network discovery process.

Figure 12:
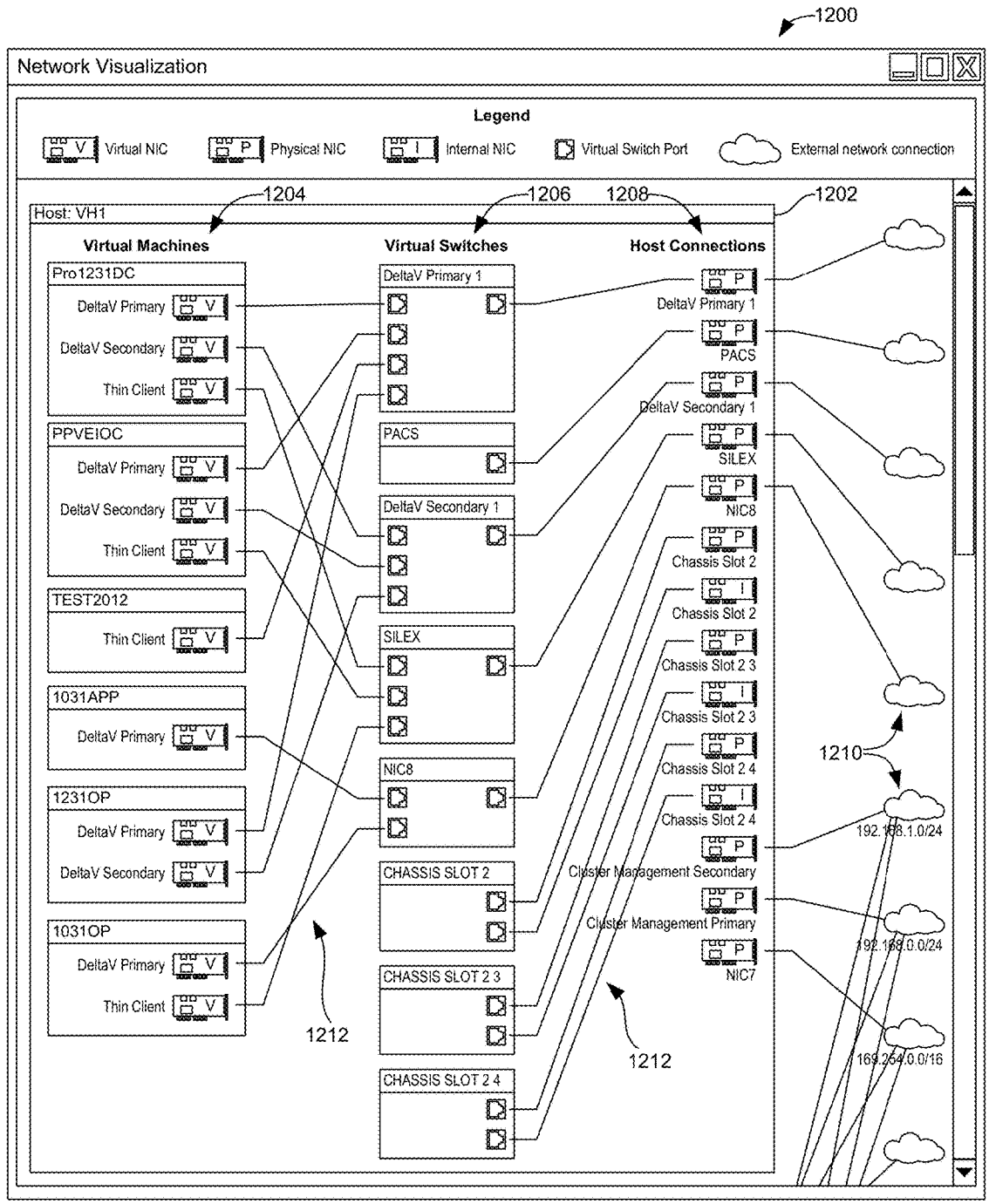
FIG. 12 illustrates an example visual schematic of a virtual process control system network generated by the example virtual network configuration system of FIG. 2.

Additionally, through the information contained in the XML file, the example virtual network visualization generator may generate a visual schematic of the virtual network connections implemented in the virtual process control environment 106. An example visual schematic 1200 of a portion of a virtual process control system is illustrated in FIG. 12. In particular, the schematic includes a host box 1202 representative of one of the host servers. Within the host box 1202 there are graphical representations of virtual machines 1204, virtual switches 1206, and host connections or network adapters 1208. Further, in some examples, the virtual machines are represented by boxes with graphical icons corresponding to network cards to represent the virtual network adapters implemented for each identified virtual machine. As shown in the illustrated example, the network card icons within the different virtual machines are also labeled with the appropriate name for quick recognition by a user. In some examples, as described above, the names of the virtual network cards correspond to the names in the list of configuration names in the configuration data structure described above in connection with FIG. 5. As shown in FIG. 12, individual virtual switch ports are also represented by graphical icons corresponding to Ethernet ports and are grouped within boxes corresponding to the different networks the virtual switches connect. In the illustrated example, the physical network adapters are represented by graphical icons representative of network cards similar to the virtual network cards within the virtual machines except that they are distinguished with a different letter (e.g., "V" for virtual, "I" for internal (e.g., inside a chassis with an integrated storage, and "P" for physical). While specific graphical icons are shown, other icons and/or distinguishing features (e.g., color) may additionally or alternatively be used). Outside of the host box 1202, the example visual schematic 1200 includes icons representative of external network connections 1210. In some examples, the external network connections are labeled with the corresponding IP address to facilitate their identification to a user. In some examples, other components in the schematic 1200 (e.g., the host connections 1208) are likewise labeled with corresponding IP addresses and/or MAC (media access control) addresses. As shown in the illustrated example, each of the virtual machine network adapters, the virtual switch ports, the host connections, and the external network connections are connected with lines 1212 representing the connection between components. In this manner, an end user can quickly assess the nature and setup of an entire process control system, which can greatly facilitate in troubleshooting and/or generally understanding the network (e.g., to document and/or archive the configuration).

Returning to the illustrated example of FIG. 2, the virtual network configuration system 200 is provided with the example user input interface 226 to receive inputs from a user (e.g., in connection with prompts from any of the dialogues described above) and the example user display interface 228 to provide information to the user (e.g., display the dialogues described above).

While an example manner of implementing the virtual network configuration system 200 is illustrated in FIG. 2, one or more of the elements, processes and/or devices illustrated in FIG. 2 may be combined, divided, re-arranged, omitted, eliminated and/or implemented in any other way. Further, the example virtual network implementation module 202, the example configuration parameters module 204, the example host configuration module 206, the example network card name assigner 208, the example IP address designator 210, the example frame size assigner 212, the example shared storage configuration module 214, the example virtual machine generator 216, the example template database 218, the example virtual network analyzer 220, the example network discoverer 222, the example virtual network visualization generator 224, the example user input interface 226, the example user display interface 228, and/or, more generally, the example virtual network configuration system 200 of FIG. 2 may be implemented by hardware, software, firmware and/or any combination of hardware, software and/or firmware. Thus, for example, any of the example virtual network implementation module 202, the example configuration parameters module 204, the example host configuration module 206, the example network card name assigner 208, the example IP address designator 210, the example frame size assigner 212, the example shared storage configuration module 214, the example virtual machine generator 216, the example template database 218, the example virtual network analyzer 220, the example network discoverer 222, the example virtual network visualization generator 224, the example user input interface 226, the example user display interface 228, and/or, more generally, the example virtual network configuration system 200 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example virtual network implementation module 202, the example configuration parameters module 204, the example host configuration module 206, the example network card name assigner 208, the example IP address designator 210, the example frame size assigner 212, the example shared storage configuration module 214, the example virtual machine generator 216, the example template database 218, the example virtual network analyzer 220, the example network discoverer 222, the example virtual network visualization generator 224, the example user input interface 226, and/or the example user display interface 228 is/are hereby expressly defined to include a tangible computer readable storage device or storage disk such as a memory, a digital versatile disk (DVD), a compact disk (CD), a Blu-ray disk, etc. storing the software and/or firmware. Further still, the example virtual network configuration system 200 of FIG. 2 may include one or more elements, processes and/or devices in addition to, or instead of, those illustrated in FIG. 2, and/or may include more than one of any or all of the illustrated elements, processes and devices.

Flowcharts representative of example methods for implementing the virtual network configuration system 200 of FIG. 2 are shown in FIGS. 13-23. In this example, the methods may be implemented using machine readable instructions that comprise a program for execution by a processor such as the processor 2412 shown in the example processor platform 2400 discussed below in connection with FIG. 24. The program may be embodied in software stored on a tangible computer readable storage medium such as a CD-ROM, a floppy disk, a hard drive, a digital versatile disk (DVD), a Blu-ray disk, or a memory associated with the processor 2412, but the entire program and/or parts thereof could alternatively be executed by a device other than the processor 2412 and/or embodied in firmware or dedicated hardware. Further, although the example program is described with reference to the flowchart illustrated in FIGS. 13-23, many other methods of implementing the example virtual network configuration system 200 may alternatively be used. For example, the order of execution of the blocks may be changed, and/or some of the blocks described may be changed, eliminated, or combined.

As mentioned above, the example methods of FIGS. 13-23 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example methods of FIGS. 13-23 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

Figure 13:
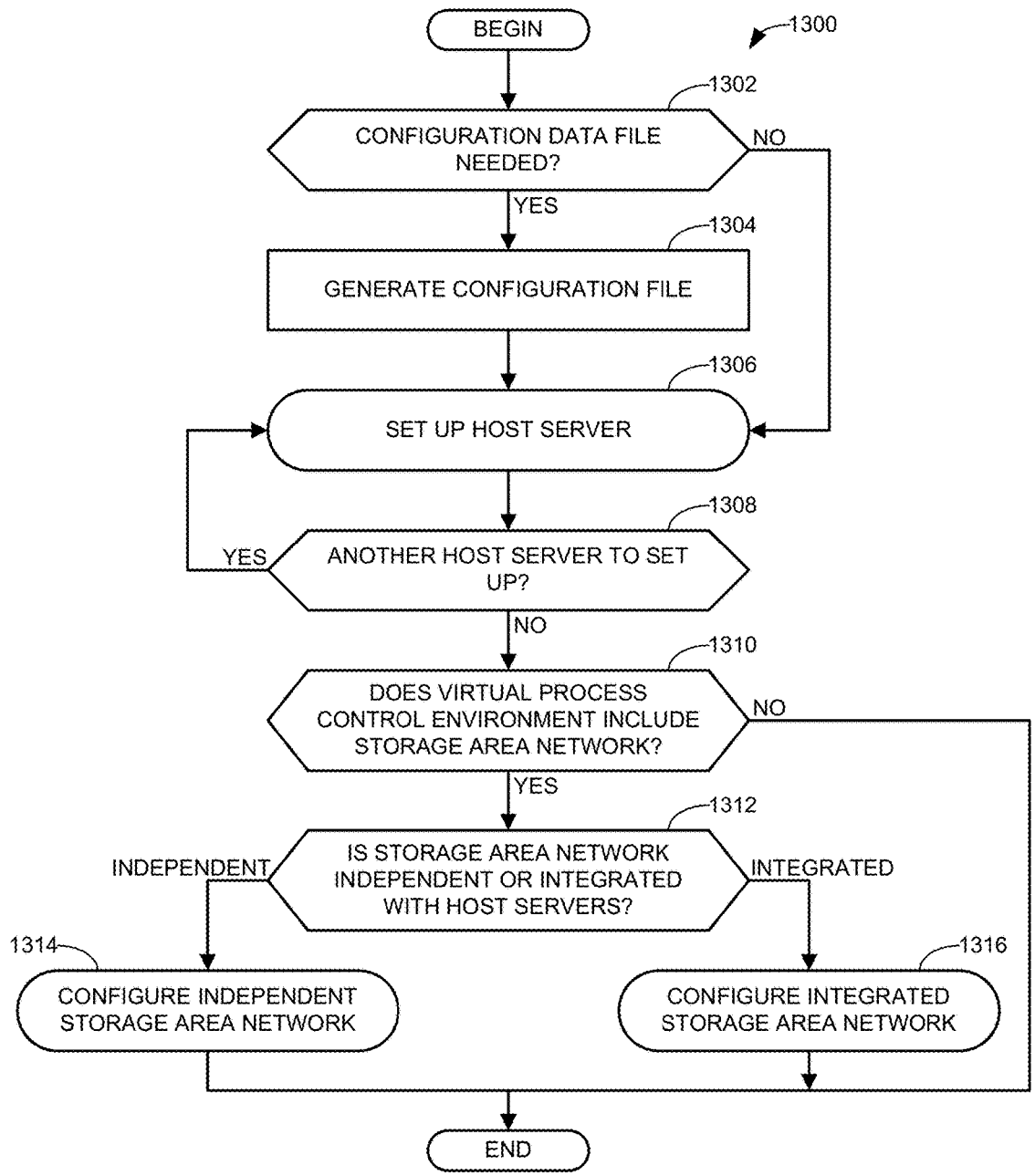
FIG. 13 is a flowchart illustrating an example method to implement the example virtual network configuration system of FIG. 2 to configure the virtual process control environment of FIG. 1.

Turning to the figures in detail, FIG. 13 is a flowchart 1300 illustrating an example method to configure a virtual process control environment (e.g., the virtual process control environments 106, 130 of FIG. 1) for a process control system (e.g., the DCS 100 of FIG. 1). The example method begins at block 1302 where the example virtual network implementation module 202 determines whether a configuration data file is needed. For example, if the configuration is for the virtual process control environment 106 with separate host servers 110, 112, 114 and a separate SAN 116 (e.g., indicated by the first option 302 of FIG. 3), a configuration data file may be needed (e.g., the configuration data structure 502 described in connection with FIGS. 5A and 5B as a .CSV file). By contrast, if the configuration is for the virtual process control environment 130 with host servers 132, 134, 136 in a chassis 138 with integrated shared storage (e.g., indicated by the second option 302 of FIG. 3), a configuration data file is not necessary because the configuration data structure may be provided by a manufacturer and/or control system vendor. If the example virtual network implementation module 202 determines that a configuration data file is needed (block 1302), control advances to block 1304 where the example configuration parameters module generates a configuration data file (e.g., the configuration data structures 500, 502). In some examples, the configuration data file is generated based on user inputs. In some examples, the user may have independently generated the configuration data file and the configuration parameters module 204 imports it for use in the configuration process. In some examples, the manufacturer provides default values for at least some of the parameters (e.g., names and values) within the configuration data file. Once the configuration data file is generated, control advances to block 1306. If the example virtual network implementation module 202 determines that a configuration data file is not needed (block 1302), control advances directly to block 1306.

At block 1306, the example host configuration module 206 sets up a host server (e.g., one of the host servers 110, 112, 114, 132, 134, 136). In some examples, the initial set up or configuration of each host server is based on information contained in the configuration data structure or file generated at block 1304 and/or a corresponding configuration data structure otherwise provided (e.g., from a manufacturer). Configuring or setting up the host servers 110, 112, 114, 132, 134, 136 is described in greater detail below in connection with FIGS. 14-17. After setting up one of the host servers 110, 112, 114, 132, 134, 136, the example virtual network implementation module 202 determines whether there is another host server to set up (block 1308). In some examples, configuring another host server is determined when a user instigates the configuration process for another host server. If so, control returns to block 1306. Otherwise, control advances to block 1310

At block 1310, the example virtual network implementation module 202 determines whether the virtual process control environment 106, 130 includes a storage area network (e.g., the SAN 116 of the virtual process control environment 106 or the integrated shared storage of the virtual process control environment 130). If the example virtual network implementation module 202 determines that there is a storage area network (block 1310), control advances to block 1312 where the example virtual network implementation module 202 determines whether the storage area network is independent of the host servers (e.g., the SAN 116 of the virtual process control environment 106 of FIG. 1) or integrated with the host servers (e.g., the integrated shared storage of the virtual process control environment 130 of FIG. 1). If the example virtual network implementation module 202 determines that the storage area network is independent (block 1312) control advances to block 1314 where the example shared storage configuration module configures the independent storage area network before example method of FIG. 13 ends. An example method to configure the independent storage is described in further detail below in connection with FIG. 18. If the example virtual network implementation module 202 determines that the storage area network is integrated (block 1312) control advances to block 1316 where the example shared storage configuration module configures the integrated storage area network before example method of FIG. 13 ends. An example method to configure the independent storage is described in further detail below in connection with FIG. 19. Returning to block 1310, if the example virtual network implementation module 202 determines that the virtual process control environment does not include a storage area network, the example method of FIG. 13 ends.

Figure 14:
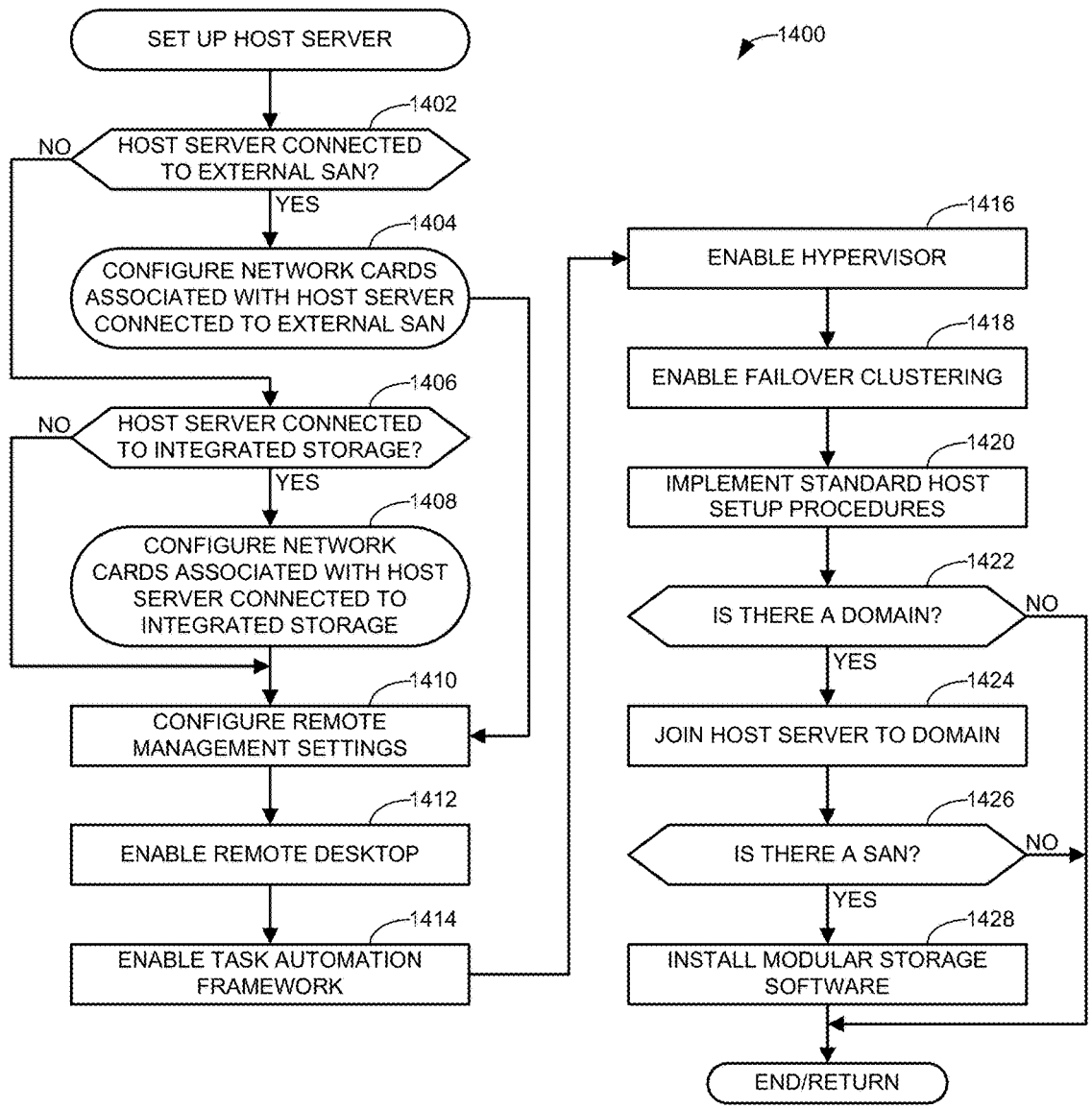
FIG. 14 is a flowchart 1400 illustrating an example method to implement the example virtual network configuration system of FIG. 2 to configure or set up the host servers of FIG. 1.

FIG. 14 is an example flowchart 1400 illustrating an example method to configure or set up a host server (e.g., the host servers 110, 112, 114, 132, 134, 136 of FIG. 1). The example method of FIG. 14 is an example implementation of block 1306 of FIG. 13. The example method begins at block 1402 where the example host configuration module 206 determines whether the host is connected to an external SAN (e.g., the SAN 116 in the virtual process control environment 106 of FIG. 1). If the example host configuration module 206 determines that the host server is connected to an external SAN (e.g., the first option 302 of FIG. 3 was selected), control advances to block 1404 where the example host configuration module 206 configures (e.g., synchronizes) network cards associated with the host server connected to the SAN. Additional details regarding the synchronization of network cards are provided below in connection with FIGS. 15 and 16. Once the network cards are configured (block 1404), control advances to block 1410.

Returning to block 1402, if the example host configuration module 206 determines that the host is not connected to an external SAN, control advances to block 1406 where the example host configuration module 206 determines whether the host server is connected to an integrated storage (e.g., the integrated shared storage of the chassis 138 of the virtual process control environment 130 of FIG. 1). If the example host configuration module 206 determines that the host is connected to an integrated storage (e.g., the second option 304 of FIG. 3 was selected), control advances to block 1408 where the example host configuration module 206 configures network cards associated with the host server connected to the integrated storage. Additional details regarding the synchronization of network cards are provided below in connection with FIG. 17. Once the network cards are configured (block 1408), control advances to block 1410. If the example host configuration module 206 determines that the host is not connected to an integrated storage (e.g., the third option 306 of FIG. 3 was selected), control advances directly to block 1410.

At block 1410, the example host configuration module 206 configures remote management settings (e.g., MMC (Microsoft™ Management Console) for the virtual process control environment 106, 130. At block 1412, the example host configuration module 206 enables remote desktop (to enable interactions with the virtual process control environment 106, 130 via the thin clients 126 of FIG. 1). At block 1414, the example host configuration module 206 enables a task automation framework (e.g., PowerShell™ by Windows™). At block 1416, the example host configuration module 206 enables a hypervisor (e.g., Hyper-V™). At block 1418, the example host configuration module 206 enables failover clustering. Failover clustering is the ability to automatically move a virtual machine to different hosts if one of the hosts has a hardware failure. At block 1420, the example host configuration module 206 implements other standard host setup procedures.

At block 1422, the example host configuration module 206 determines whether there is a domain. If there is a domain, control advances to block 1424 where the example host configuration module 206 joins the host server to the domain. If there is not a domain, the example method of FIG. 14 ends. At block 1426, the example host configuration module 206 determines whether there is a storage area network (e.g., either an external SAN or incorporated as an integrated shared storage). If there is a storage area network, control advances to block 1428 the example host configuration module 206 installs modular storage software (e.g., Dell™ MD) at which point the example method of FIG. 14 ends or returns (e.g., to complete the implementation of the method of FIG. 13). If the example host configuration module 206 determines that there is no storage area network (block 1426), the example method of FIG. 14 ends or returns.

Figure 15:
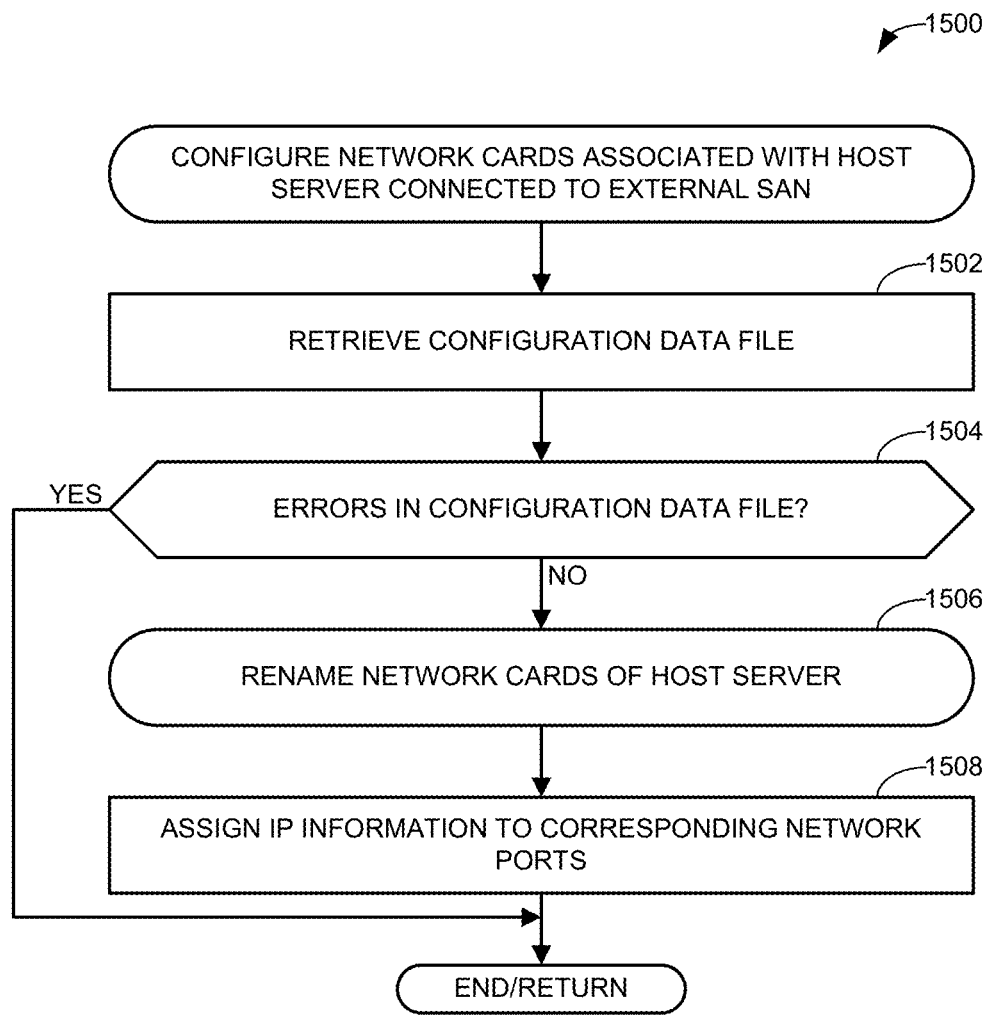
FIG. 15 is a flowchart illustrating an example method to implement the example virtual network configuration system of FIG. 2 to configure network cards of the host server of FIG. 1.

FIG. 15 is an example flowchart 1500 illustrating an example method that may be implemented as part of block 1404 of FIG. 14 to configure network cards associated with a host server connected to a SAN (e.g., the host servers 110, 112, 114 of the virtual process control environment 106 of FIG. 1). The example method begins at block 1502 where the example configuration parameters module 204 retrieves the configuration data file (e.g., generated at block 1304 of FIG. 13). At block 1504, the example configuration parameters module 204 determines whether there are any errors in the configuration data file. In some examples, the errors that are checked include whether the configuration data file is the correct file type (e.g., a .CSV file); whether the identified configuration data file exists at an identified file path provided by the user; whether the configuration data file is empty and/or contains empty values; whether the name of the host server being set up corresponds to one of the names of the configuration data file (if not, an error message may be presented to either edit the configuration data file or change the name of the host server before beginning the host setup process again); whether a cluster setup section (e.g., the a cluster setup section 516 of FIG. 5B) is identified in the configuration data file (if not, all labels within the configuration data file will be treated as being part of the network card name setup section 512); whether all required labels (e.g., the fixed labels in the cluster setup section 516) are in the configuration data file; whether the values are in proper format (e.g., IP address or subnet format); etc. If an error in the configuration data file is detected the example method ends and the user is given an opportunity to correct the file and then begin the host server configuration process 1400 of FIG. 14 again. If no errors are detected (block 1504), control advances to block 1506 where the example network card name assigner renames the network cards of the host server. An example method to rename network cards is described in greater detail below in connection with FIG. 16. At block 1508, the example IP address designator 210 assigns the IP information (e.g., contained in the configuration data structure/file) to the corresponding network ports after which the example method of FIG. 15 ends and returns to complete the example method of FIG. 14 as described above.

Figure 16:
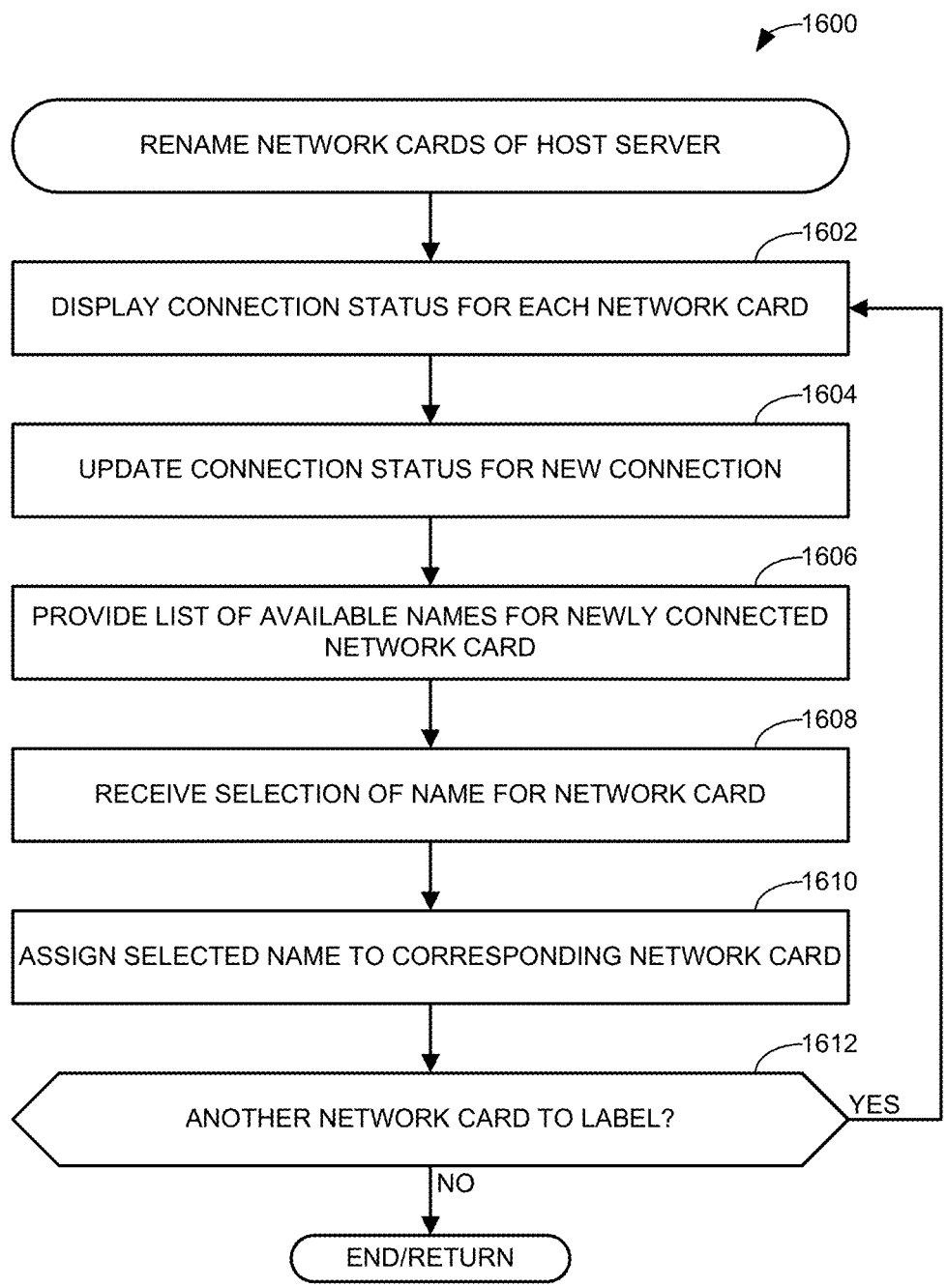
FIG. 16 is a flowchart illustrating an example method to implement the example virtual network configuration system of FIG. 2 to configure network cards associated with the host servers of FIG. 1.

FIG. 16 is an example flowchart 1600 illustrating an example method that may be implemented as part of block 1506 of FIG. 15 to rename network cards of a host server. The example method of FIG. 16 begins at block 1602 where the example user display interface 228 displays a connection status for each network card (e.g., the indicators in the connection status column 608 of FIG. 6). At block 1604, the example user display interface 228 updates the connection status for a new connection in one of the network cards. In some examples, a new connection occurs when a user (e.g., an engineer) plugs a cable into one of the ports of the network cards associated with the host server being configured. At block 1606, the example user display interface 228 provides a list of available names for the newly connected network card. In some examples, the list of available names corresponds to the list of configuration names included within the configuration data structure or file generated by the example configuration parameters module 204. At block 1608, the example user input interface 226 receives a selection (e.g., from a user) of a name for the network card. In some examples, the user selects the name corresponding to the network associated with the cable most recently plugged into the network card as identified by the change in the connection status indicator. At block 1610, the example network card name assigner 208 assigns the selected name to the corresponding network card. At block 1612, the example network card name assigner 208 determines whether there is another network card to be named. In some examples, this is determined based on whether all the network cards are indicated as being connected in the connection status column 608 in FIG. 6. If there are more network cards to name, control returns to block 1602. If all network cards have been labeled, the example method of FIG. 16 ends and returns to complete the method of FIG. 15.

Figure 17:
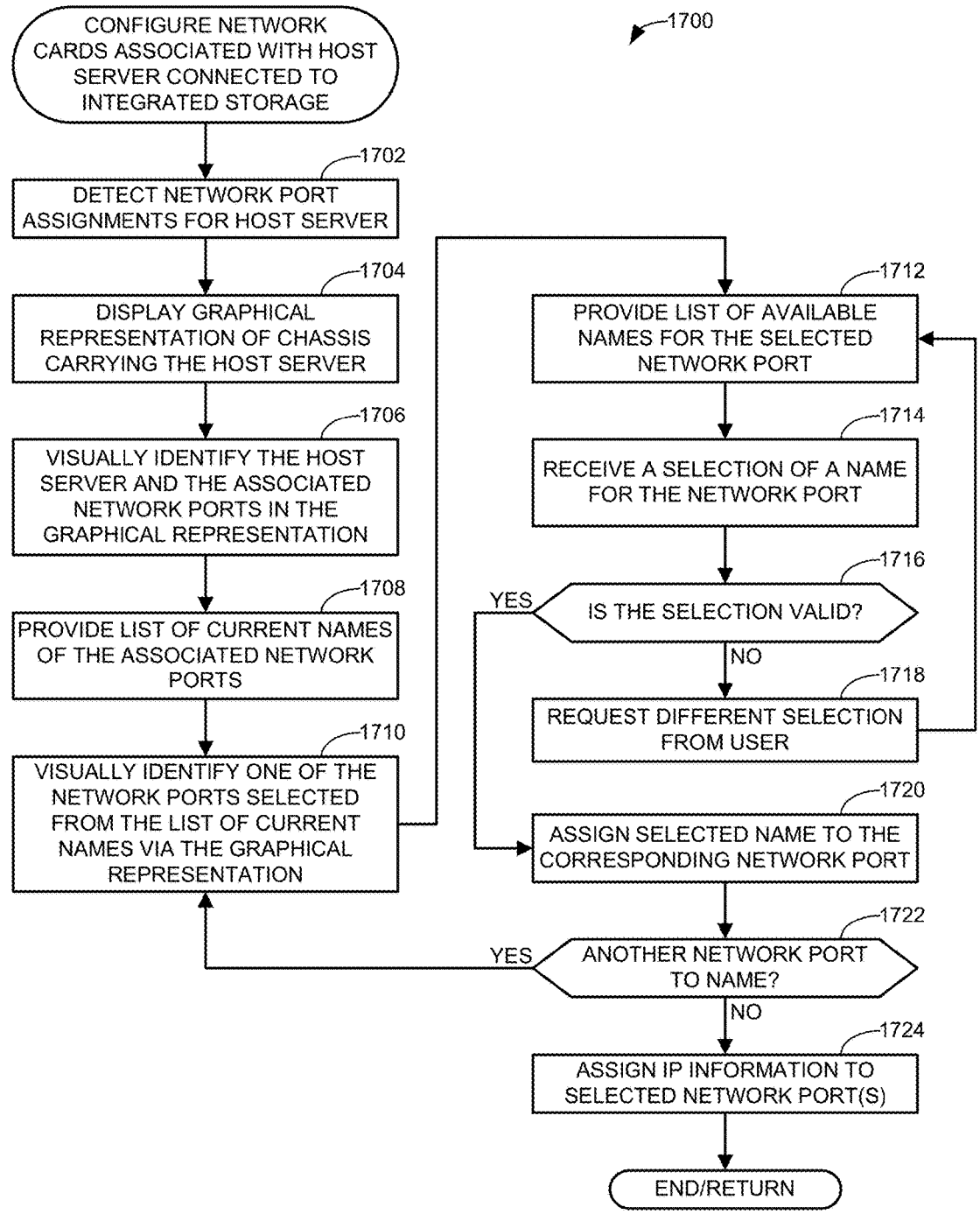
FIG. 17 is a flowchart illustrating an example method to implement the example virtual network configuration system of FIG. 2 to configure network cards associated with the host servers of FIG. 1.

FIG. 17 is an example flowchart 1700 illustrating an example method that may be implemented as part of block 1408 of FIG. 14 to configure network cards associated with a host server connected to an integrated storage (e.g., the host servers 132, 134, 136 of the virtual process control environment 130 of FIG. 1). The example method of FIG. 17 begins at block 1702 where the example host configuration module 206 detects network port assignments for the host server. In some examples, this is possible because the host servers (and associated network cards) are communicatively coupled in a known manner within a chassis 138 having an integrated shared storage as described above. At block 1704, the example user display interface 228 displays a graphical representation of the chassis 138 carrying the host server (e.g., the front 710 and the back 712 of the chassis 138 as shown in the illustrated example of FIG. 7). At block 1706, the example user display interface 228 visually identifies the host server and the associated network ports in the graphical representation (e.g., via the boxes 720, 722, 724 of FIG. 7). At block 1708, the example user display interface 228 provides a list of current names of the associated network ports to the user (e.g., via the current port name column 702 of FIG. 7). At block 1710, the example user display interface 228 visually identifies one of the network ports selected from the list of current names via the graphical representation (e.g., via the dot or other indicator 726 of FIG. 7).

At block 1712, the example user display interface 228 provides a list of available names for the selected network port. In some examples, the list of available names corresponds to the list of configuration names included within the configuration data structure or file generated by the example configuration parameters module 204. At block 1714, the example user input interface 226 receives a selection (e.g., from a user) of a name for the network port. At block 1716, the example network card name assigner 208 determines whether the selection is valid. For example, the network card name assigner 208 may verify whether the selected name has already been assigned to a different network port. If the example network card name assigner 208 determines that the selection is not valid, control advances to block 1718 where the example user display interface requests a different selection from the user. If the example network card name assigner 208 determines that the selection is valid, control advances to block 1720 where the example network card name assigner 208 assigns the selected name to the corresponding network port.

At block 1722, the example network card name assigner 208 determines whether there is another network port to be named. In some examples, this is determined based on whether the user selects another one of the ports for naming. If there are more network cards to name, control returns to block 1710. If all network cards have been named, control advances to block 1724 where the example IP address designator 210 assigns IP information to selected network port(s) (e.g., selected via the IP configuration column 706 of FIG. 7). In some examples, the IP information is automatically assigned to the selected network port(s) based on the IP information contained in the configuration data structure for the virtual process control environment. In some examples, the assignment of the IP information is displayed to the user (e.g., via the network card configuration dialogue 800 of FIG. 8) to allow a user to change and/or accept the assigned information. Once the selected network ports have been assigned the appropriate IP information, the example method of FIG. 17 ends and returns to complete the method of FIG. 14.

Figure 18:
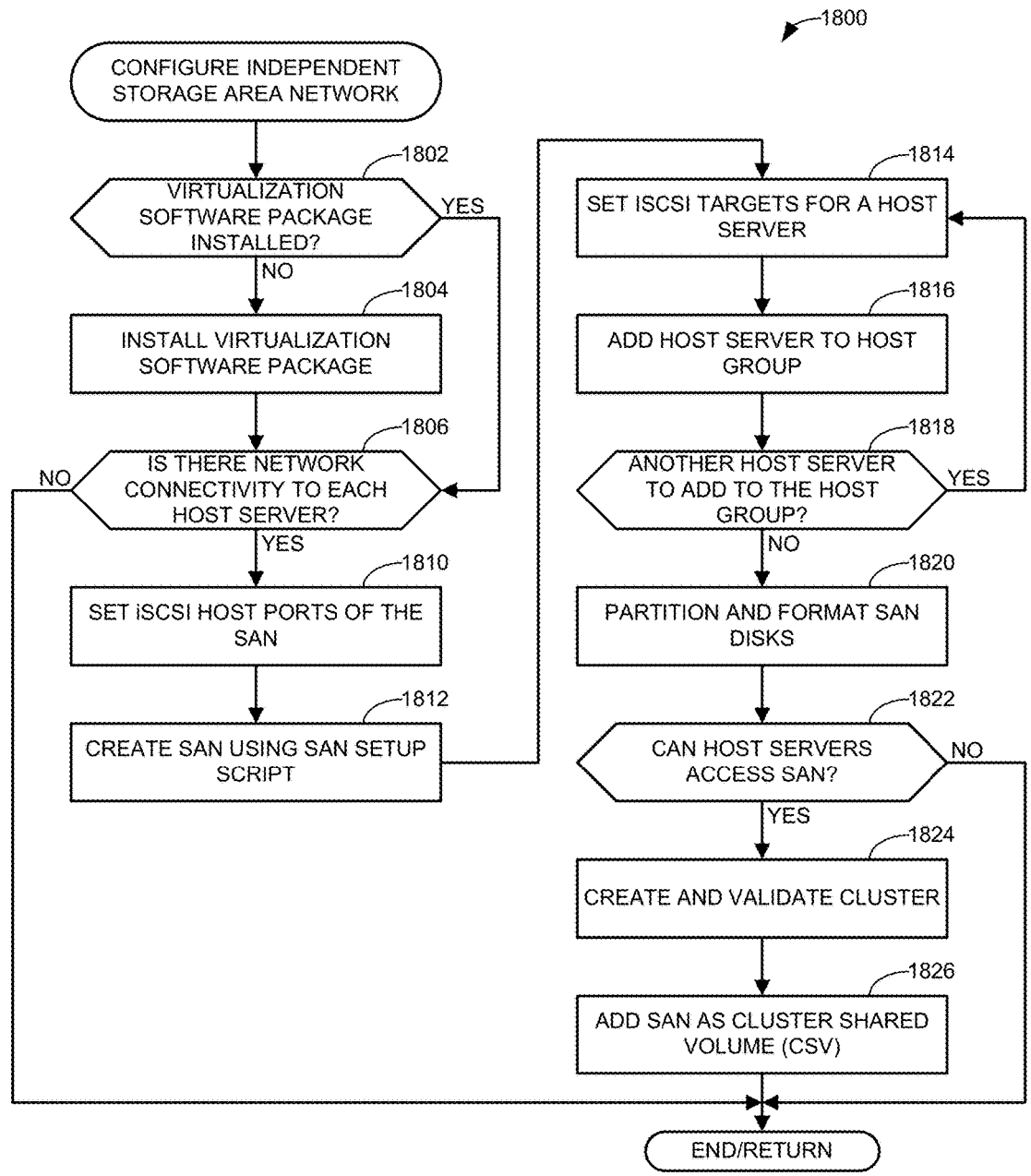
FIG. 18 is a flowchart illustrating an example method to implement the example virtual network configuration system of FIG. 2 to configure the SAN of FIG. 1.

FIG. 18 is an example flowchart 1800 illustrating an example method that may be implemented as part of block 1314 of FIG. 13 to configure an independent storage area network (e.g., the SAN 116 of FIG. 1). In some examples, the method is implemented via the domain controller 108 of FIG. 1 (e.g., a cluster manager and domain controller (CDC)). In some examples, a virtualization software package (e.g., DeltaV™ Virtual Studio), which integrates process control products and the hypervisor to manage workstation visualization, is installed on the domain controller 108 prior to implementing the example method of FIG. 18 to enable the setup of credentials for remote control of the rest of the virtual process control environment 106. Further, in some examples, the modular storage software (e.g., installed on the host servers 110, 112, 114 at block 1428 of FIG. 14) is installed on the SAN management machine prior to implementing the example method of FIG. 18. Additionally, in some examples, a user may auto-discover the SAN 116 and name it prior to implementing the example method of FIG. 18.

The example method of FIG. 18 begins at block 1802 where the example shared storage configuration module 214 determines whether the virtualization software package (e.g., DeltaV™ Virtual Studio) is installed. If so, control advances to block 1806, otherwise the example shared storage configuration module 214 installs the virtualization software package (block 1804) before advancing to block 1806. At block 1806, the example shared storage configuration module 214 determines whether there is network connectivity to each host server 110, 112, 114. If the example shared storage configuration module 214 determines that there is not network connectivity, the example method of FIG. 18 ends (e.g., with an error message indicating the configuration process failed). If there is network connectivity to each host server 110, 112, 114, control advances to block 1810. At block 1810, the example shared storage configuration module 214 sets up the internet small computer system interface (iSCSI) host ports of the SAN 116. At block 1812, the example shared storage configuration module 214 creates the SAN 116 using a SAN setup script. At block 1814, the example shared storage configuration module 214 sets iSCSI targets for a host server (e.g., one of the host servers 110, 112, 114). At block 1816, the example shared storage configuration module 214 adds the host server to a host group (e.g., created using the SAN setup script). At block 1818, the example shared storage configuration module 214 determines whether there is another host server to add to the host group. If there is another host server, control returns to block 1814. If there are no more host servers to add, control advances to block 1820 where the example shared storage configuration module 214 partitions and formats the SAN disks. At block 1822, the example shared storage configuration module 214 determines whether the host servers can access the SAN 116. If not, the example method ends (e.g., with an error message indicating the configuration process failed). If the example shared storage configuration module 214 determines that the host servers can access the SAN 116 (block 1822), control advances to block 1824 where the example shared storage configuration module 214 creates and validates the cluster. Finally, at block 1826, the example shared storage configuration module 214 adds the SAN 116 as a cluster shared volume (CSV), at which point the example method of FIG. 18 ends.

Figure 19:
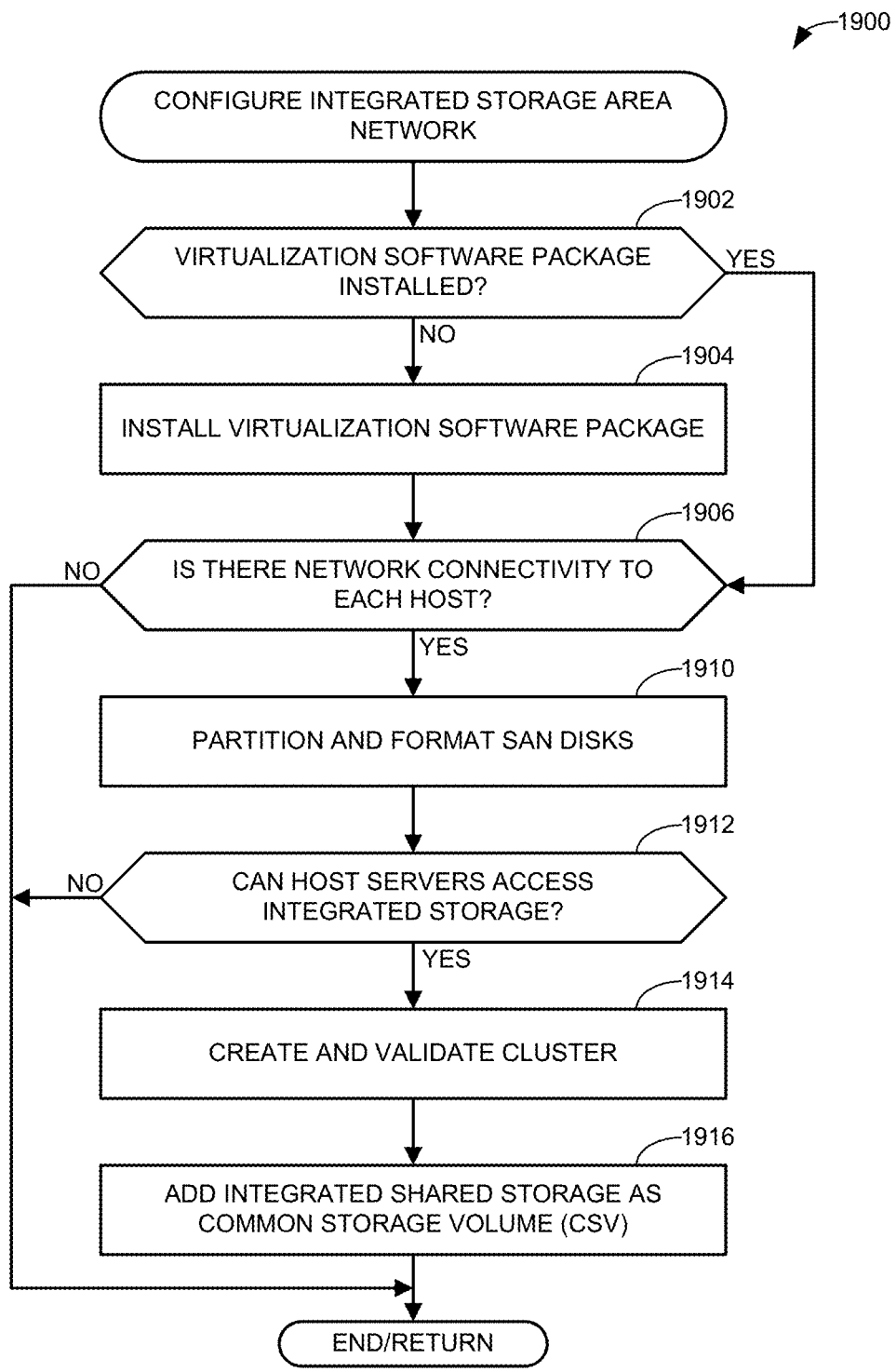
FIG. 19 is a flowchart illustrating an example method to implement the example virtual network configuration system of FIG. 2 to configure the integrated shared storage of FIG. 1.

FIG. 19 is an example flowchart 1900 illustrating an example method that may be implemented as part of block 1316 of FIG. 13 to configure an integrated storage area network (e.g., the integrated shared storage of the chassis 138 of FIG. 1). In some examples, as with the example method of FIG. 18, the method is implemented via the domain controller 108 of FIG. 1 (e.g., a cluster manager and domain controller (CDC)). In some examples, a virtualization software package (e.g., DeltaV™ Virtual Studio), which integrates process control products and the hypervisor to manage workstation visualization, is installed on the domain controller 108 prior to implementing the example method of FIG. 19 to enable the setup of credentials for remote control of the rest of the virtual process control environment 106. Further, in some examples, the modular storage software (e.g., installed on the host servers 110, 112, 114 at block 1428 of FIG. 14) is installed on the storage area network management machine prior to implementing the example method of FIG. 19.

The example method of FIG. 19 begins at block 1902 where the example shared storage configuration module 214 determines whether the virtualization software package (e.g., DeltaV™ Virtual Studio) is installed. If so, control advances to block 1906, otherwise the example shared storage configuration module 214 installs the virtualization software package (block 1904) before advancing to block 1906. At block 1906, the example shared storage configuration module 214 determines whether there is network connectivity to each host server 132, 134, 136. If the example shared storage configuration module 214 determines that there is not network connectivity, the example method of FIG. 19 ends (e.g., with an error message indicating the configuration process failed). If there is network connectivity to each host server 132, 134, 136, control advances to block 1910 where the example shared storage configuration module 214 partitions and formats the SAN disks. At block 1912, the example shared storage configuration module 214 determines whether the host servers can access the integrated storage. If not, the example method ends (e.g., with an error message indicating the configuration process failed). If the example shared storage configuration module 214 determines that the host servers can access the integrated storage (block 1912), control advances to block 1914 where the example shared storage configuration module 214 creates and validates the cluster. Finally, at block 1916, the example shared storage configuration module 214 adds the integrated storage as a cluster shared volume (CSV), at which point the example method of FIG. 19 ends.

In some examples, each of the blocks illustrated in the example methods of FIGS. 18 and 19 is automatically implemented without user input or involvement other than providing basic configuration parameters (e.g., via the SAN configuration dialogue 900 of FIG. 9 or the cluster configuration dialogue 1000 of FIG. 10) along with the configuration data structure or file used during the configuration process. In this manner, the storage area network setup is reduced from many hours of meticulous work (e.g., following instructions in product documentation) to the simple task of identifying the configuration parameters in the configuration data structure/file while avoiding the potential for human error that can result in a configuration mismatch. For example, current methods of configuring a storage area network involve following instructions in product documentation that can take an engineer multiple days to complete giving rise to many opportunities for errors (e.g., from reading and properly typing multiple IP addresses that may number in the dozens, properly creating different logical unit numbers (LUNs) for storage and configuring a quorum, etc.). Furthermore, such errors may not be easily detectable, thereby resulting in the setup process being restarted to correct an unknown source of error.

Figure 20:
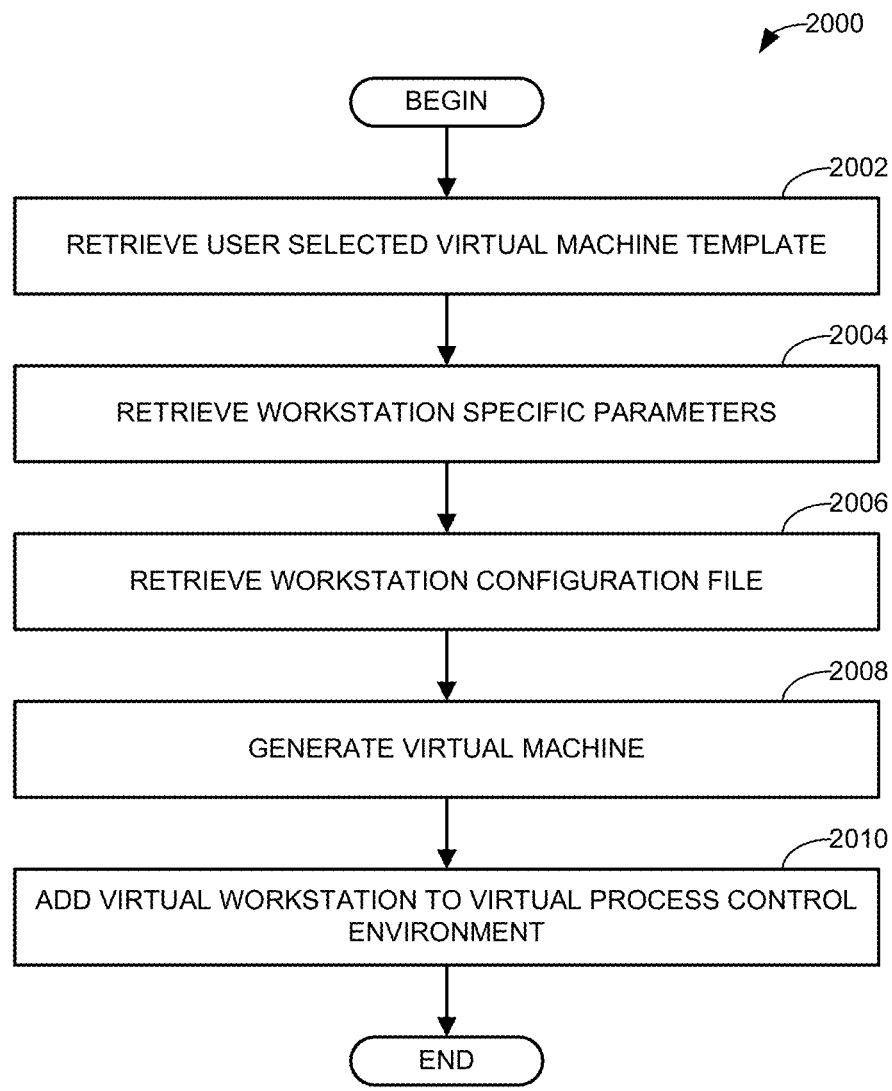
FIG. 20 is a flowchart illustrating an example method to implement the example virtual network configuration system of FIG. 2 to create a virtual workstation in a virtual process control environment.

FIG. 20 is a flowchart 2000 illustrating an example method to create a virtual workstation (e.g., the virtual workstations 117) implemented in a virtual process control environment (e.g., the virtual process control environments 106, 130). The example method begins at block 2002 where the example virtual machine generator 216 retrieves a user selected virtual machine template (e.g., from the template database 218). At block 2004, the example virtual machine generator 216 retrieves workstation specific parameters (e.g., group name, machine name, workstation type, node type, etc.) for the virtual workstation to be created (e.g., based on inputs in the virtual machine creation dialogue 1100 of FIG. 11). At block 2006, the example virtual machine generator 216 retrieves a workstation configuration file for the virtual workstation to be created. At block 2008, the example virtual machine generator 216 generates a virtual machine. In some examples, the virtual components (e.g., virtual network adapters) are automatically named according to the names of the physical network cards (associated with the host servers) as defined by the configuration data structure used during their configuration. At block 2010, a virtual workstation 217 is added to the virtual process control environment 106, after which the example method of FIG. 20 ends.

Figure 21:
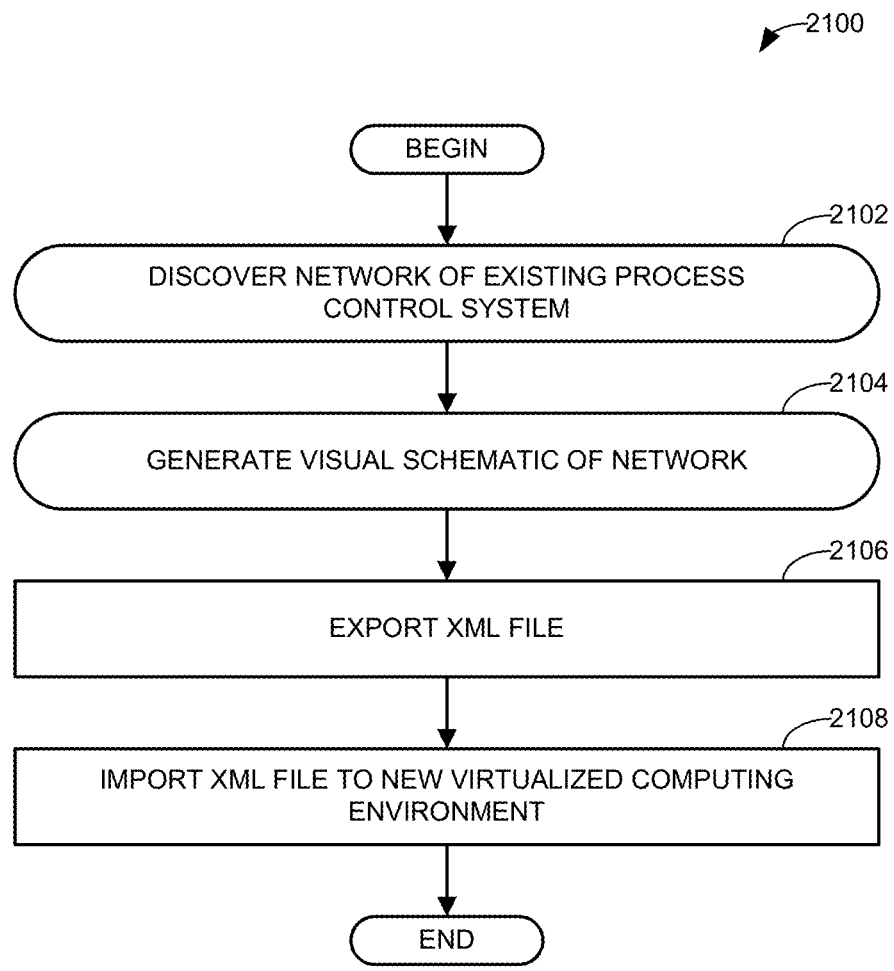
FIG. 21 is a flowchart illustrating an example method to implement the example virtual network configuration system of FIG. 2 to generate a virtual process control system based on an existing process control system.

FIG. 21 is a flowchart 2100 illustrating an example method to generate a virtual process control system in a virtual process control environment based on an existing process control system. The example process begins at block 2102 where the example network discoverer 222 discovers a network of an existing process control system. In some examples, the existing process control system is a virtual process control system. In some such examples, the discovery of the network is accomplished through a network crawling mechanism as described in greater detail below in connection with FIG. 22. At block 2104, the example network visualization generator 224 generates a visual schematic of the discovered network (e.g., the example visual schematic 1200 of FIG. 12). At block 2106, the example virtual network analyzer 220 exports an XML file (e.g., generated by the network discoverer 222). At block 2108, the example virtual network analyzer 220 imports the XML file into a new memory space to create a new virtual process control system. Once the new virtual process control system is created, the example method of FIG. 21 ends.

Figure 22:
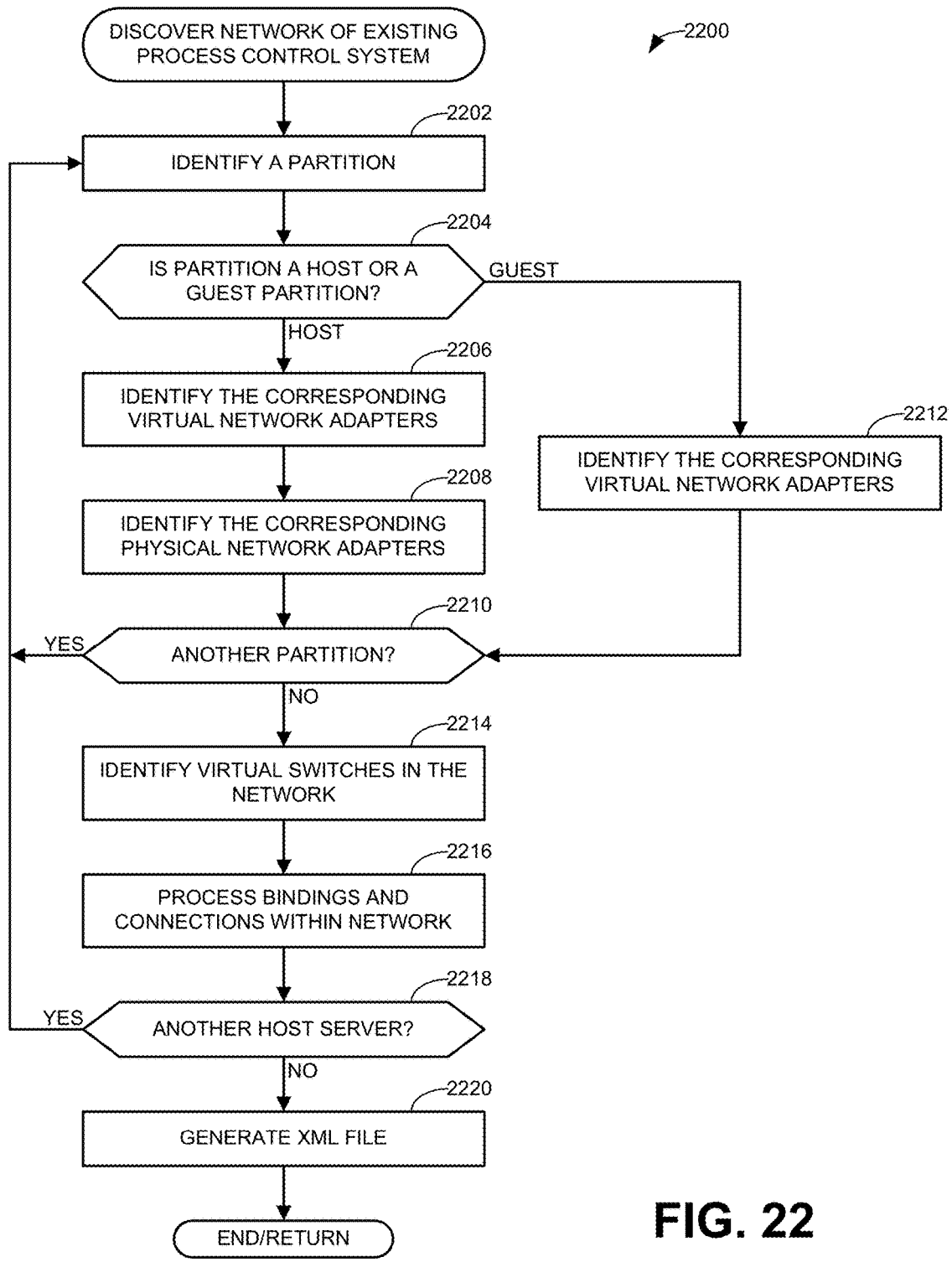
FIG. 22 is a flowchart illustrating an example method to implement the example virtual network configuration system of FIG. 2 to discover a network of an existing process control system.

FIG. 22 is a flowchart 2200 illustrating an example method that may be implemented as part of block 2102 of FIG. 21 to discover a network of an existing process control system. The example method begins at block 2202 where the example network discoverer 222 identifies a partition of a host server. At block 2204, the example network discoverer 222 determines whether the partition corresponds to a host partition or a guest partition (e.g., associated with a virtual machine on the host server). If the partition is a host partition, control advances to block 2206 where the example network discoverer 222 identifies the corresponding virtual network adapters. At block 2208, the example network discoverer 222 identifies the corresponding physical network adapters. At block 2210, the example network discoverer 222 determines whether there is another partition. If there is another partition, control returns to block 2202. If the example network discoverer 222 determines that the partition is a guest partition (block 2204), control advances to block 2212 where the example network discoverer 222 identifies the corresponding virtual adapters after which control advances to block 2210. If the example network discoverer 222 determines that there are no more partitions (block 2210), control advances to block 2214 where the example network discoverer 222 identifies virtual switches in the network. At block 2216, the example network discoverer 222 processes the bindings and connections within the discovered network. At block 2218, the example network discoverer 222 determines whether there is another host server to analyze. If so, control returns to block 2202 to repeat the process for the next host server. Otherwise, control advances to block 2220 where the example network discoverer 222 generates an XML file that defines or represents the discovered network after which the example method of FIG. 22 ends to return to complete the example method of FIG. 21.

Figure 23:
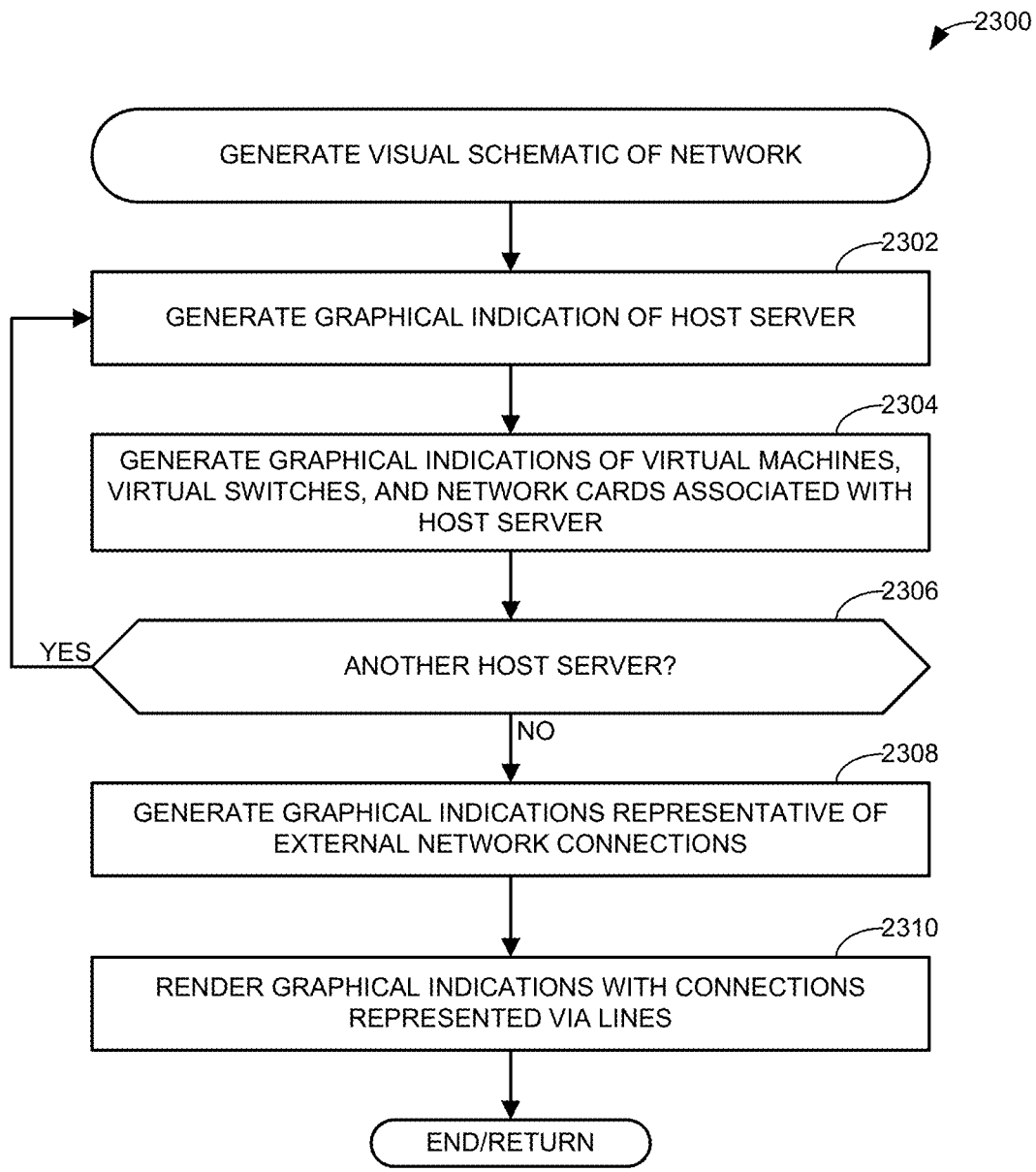
FIG. 23 is a flowchart illustrating an example method to implement the example virtual network configuration system of FIG. 2 to generate a visual schematic of a process control system network.

FIG. 23 is a flowchart 2300 illustrating an example method that may be implemented as part of block 2104 of FIG. 21 to generate a visual schematic of a network (e.g., the process control network discovered via the example method of FIG. 22). The example method of FIG. 23 begins at block 2302 where the example virtual network visualization generator 224 generates a graphical indication of a host server (e.g., the host box 1202 shown in FIG. 12). At block 2304, the example virtual network visualization generator 224 generates graphical indications of virtual machines, virtual switches, and network cards associated with the host server. In some examples, such graphical indications included labeled sub-boxes within the host box 1202. In some examples, the graphical representations may be graphical icons representative of network interface cards (indicative of the discovered network adapters) and/or icons representative of switch ports (indicative of the discovered virtual switches). At block 2206, the example virtual network visualization generator 224 determines whether there is another host server. If so, control returns to block 2302 to repeat the process for the next host server. Otherwise, control advances to block 2308 where the example virtual network visualization generator 224 generates graphical indications (or icons) representative of external network connections. In some examples, such icons include the IP address associated with the corresponding external connection. At block 2310, the example user display interface renders the graphical indications (e.g., of the host, the virtual machines, the virtual switches, the network cards, the external host connections, etc.) with connections represented via lines (e.g., the line 1212 of FIG. 12). The example method of FIG. 23 then ends or returns to complete the example method of FIG. 21.

Figure 24:
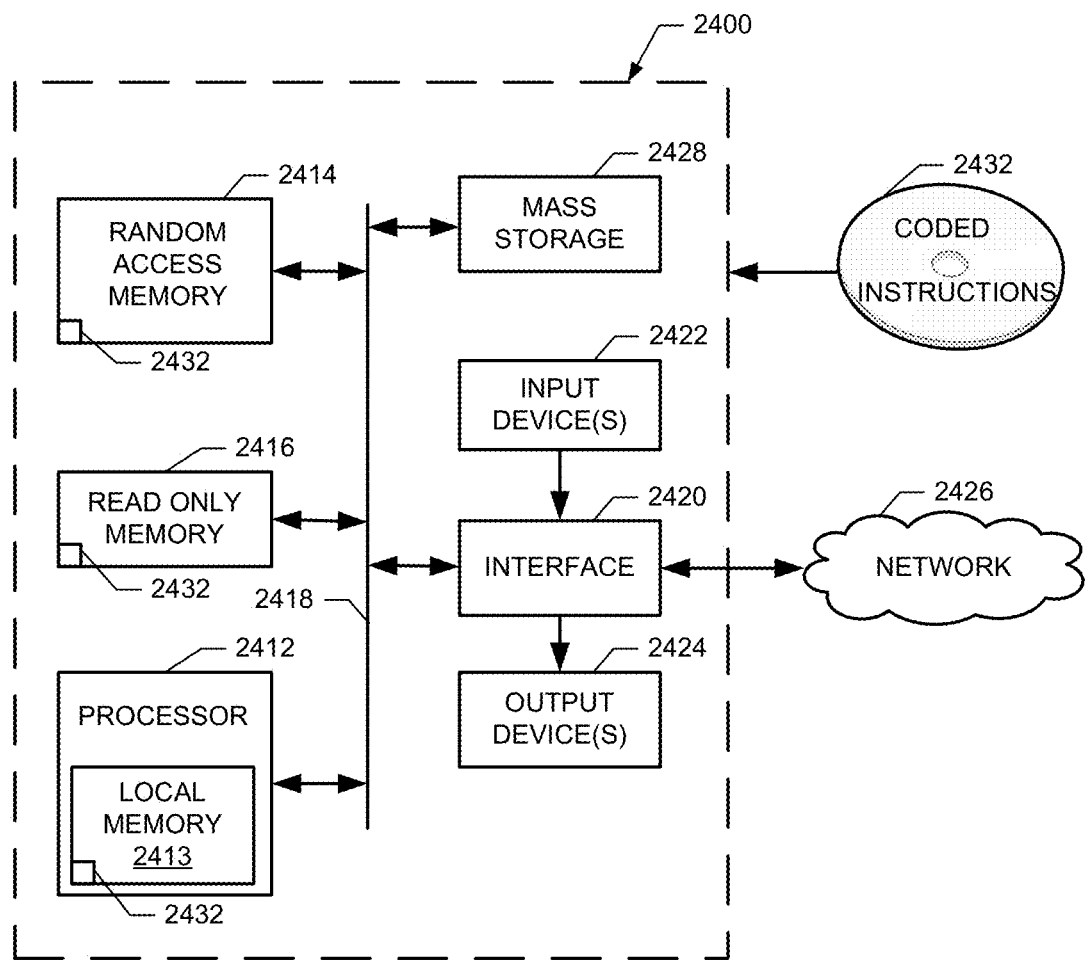
FIG. 24 is a schematic illustration of an example processor platform that may be used and/or programmed to carry out the example methods of FIGS. 13-23, and/or, more generally, to implement the example virtual network configuration system of FIG. 2.

FIG. 24 is a block diagram of an example processor platform 2400 capable of executing instructions to perform the methods of FIGS. 13-23 to implement the virtual network configuration system 200 of FIG. 2. The processor platform 2400 can be, for example, a server, a personal computer, a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, or any other type of computing device.

The processor platform 2400 of the illustrated example includes a processor 2412. The processor 2412 of the illustrated example is hardware. For example, the processor 2412 can be implemented by one or more integrated circuits, logic circuits, microprocessors or controllers from any desired family or manufacturer.

The processor 2412 of the illustrated example includes a local memory 2413 (e.g., a cache). The processor 2412 of the illustrated example is in communication with a main memory including a volatile memory 2414 and a non-volatile memory 2416 via a bus 2418. The volatile memory 2414 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 2416 may be implemented by flash memory and/or any other desired type of memory device. Access to the main memory 2414, 2416 is controlled by a memory controller.

The processor platform 2400 of the illustrated example also includes an interface circuit 2420. The interface circuit 2420 may be implemented by any type of interface standard, such as an Ethernet interface, a universal serial bus (USB), and/or a PCI express interface.

In the illustrated example, one or more input devices 2422 are connected to the interface circuit 2420. The input device(s) 2422 permit(s) a user to enter data and commands into the processor 2412. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 2424 are also connected to the interface circuit 2420 of the illustrated example. The output devices 2424 can be implemented, for example, by display devices (e.g., a light emitting diode (LED), an organic light emitting diode (OLED), a liquid crystal display, a cathode ray tube display (CRT), a touchscreen, a tactile output device, a light emitting diode (LED), a printer and/or speakers). The interface circuit 2420 of the illustrated example, thus, typically includes a graphics driver card, a graphics driver chip or a graphics driver processor.

The interface circuit 2420 of the illustrated example also includes a communication device such as a transmitter, a receiver, a transceiver, a modem and/or network interface card to facilitate exchange of data with external machines (e.g., computing devices of any kind) via a network 2426 (e.g., an Ethernet connection, a digital subscriber line (DSL), a telephone line, coaxial cable, a cellular telephone system, etc.).

The processor platform 2400 of the illustrated example also includes one or more mass storage devices 2428 for storing software and/or data. Examples of such mass storage devices 2428 include floppy disk drives, hard drive disks, compact disk drives, Blu-ray disk drives, RAID systems, and digital versatile disk (DVD) drives.

Coded instructions 2432 to implement the methods of FIGS. 13-23 may be stored in the mass storage device 2428, in the volatile memory 2414, in the non-volatile memory 2416, and/or on a removable tangible computer readable storage medium such as a CD or DVD.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A method comprising:
accessing a data structure comprising a list of configuration names for network cards associated with first and second host servers of a virtual process control environment, the first and second host servers being server blades installed in a chassis with a shared storage integrated therein, the first and second host servers implementing virtual machines corresponding to workstations for a process control system;

displaying the list of configuration names for the network cards to a user for selection during configuration of the first and second host servers, the list of configuration names displayed alongside a list of current names assigned to the network cards;

in response to the user selecting a network card from the list of current names, modifying a display of a graphical representation of the chassis to visually identify a location of a network port associated with the selected network card on the chassis;

when configuring the first host server, assigning a first name to a first one of the network cards associated with the first host server; and when configuring the second host server, assigning the first name to a second one of the network cards associated with the second host server based on a user selection of the first name from the displayed list of configuration names, the second host server being configured after the first host server.

2. The method of claim 1, further comprising updating the list of configuration names with the first name when configuring the first host server.

3. The method of claim 1, wherein the list of configuration names includes the first name before being accessed.

4. The method of claim 1, further comprising:
altering a connection status indicator of the second one of the network cards when the user plugs a cable into the second one of the network cards.

5. The method of claim 1, wherein the first and second host servers are communicatively coupled as a cluster and communicatively coupled to the shared storage.

6. The method of claim 5, wherein the data structure comprises internet protocol information for each of the first and second host servers corresponding to ones of the configuration names in the list of configuration names, the method further comprising assigning the internet protocol information corresponding to the first name for the second host server to the second one of the network cards when configuring the second host server.

7. The method of claim 1, further comprising:
receiving inputs from the user to create a new virtual machine to serve as a new workstation in the process control system;
retrieving a virtual machine template corresponding to the new workstation; and
automatically configuring the new virtual machine based on the inputs and based on the virtual machine template; and
implementing the new virtual machine in the virtual process control environment.

8. The method of claim 1, further comprising generating a visual schematic of virtual network connections implemented in the virtual process control environment, the virtual network connections represented by lines between icons representative of at least ones of virtual machines, virtual switches, or the network cards associated with the first and second host servers.

9. A system comprising:
memory including machine readable instructions;
a processor to execute the instructions to:
access a data structure comprising a list of configuration names for network cards associated with first and second host servers of a virtual process control environment, the first and second host servers being server blades to be installed in a chassis with a shared storage integrated therein, the first and second host servers to implement virtual machines corresponding to workstations for a process control system;
assign a first name to a first one of the network cards associated with the first host server when the processor configures the first host server; and
after configuring the first host server, assign the first name to a second one of the network cards associated with the second host server based on a user selection of the first name from the list of configuration names when the processor configures the second host server; and
a user interface to:
display the list of configuration names for the network cards to a user for selection during configuration of the first and second host servers, the list of configuration names displayed alongside a list of current names assigned to the network cards; and
in response to the user selecting a network card from the list of current names, modify a display of a graphical representation of the chassis to visually identify a location of a network port associated with the selected network card on the chassis.

10. The system of claim 9, wherein the first name is added to the list of configuration names when the processor configures the first host server.

11. The system of claim 9, wherein the list of configuration names includes the first name before the processor configures the first host server.

12. The system of claim 9, wherein the first and second host servers are communicatively coupled as a cluster and communicatively coupled to the shared storage.

13. The system of claim 12, wherein the data structure comprises internet protocol information for each of the first and second host servers corresponding to ones of the configuration names in the list of configuration names, the system further comprising an internet protocol address designator to assign the internet protocol information corresponding to the first name for the second host server to the second one of the network cards when the processor configures the second host server.

14. A tangible computer readable storage medium comprising instructions that, when executed, cause a machine to at least:
access a data structure comprising a list of configuration names for network cards associated with first and second host servers of a virtual process control environment, the first and second host servers being server blades installed in a chassis with a shared storage integrated therein, the first and second host servers implementing virtual machines corresponding to workstations for a process control system;
display the list of configuration names for the network cards to a user for selection during configuration of the first and second host servers, the list of configuration names displayed alongside a list of current names assigned to the network cards;
in response to the user selecting a network card from the list of current names, modify a display of a graphical representation of the chassis to visually identify a location of a network port associated with the selected network card on the chassis;
when configuring the first host server, assign a first name to a first one of the network cards associated with the first host server; and
when configuring the second host server, assign the first name to a second one of the network cards associated with the second host server based on a user selection of the first name from the displayed list of configuration names, the second host server being configured after the first host server.

15. The storage medium of claim 14, wherein the instructions further cause the machine to:
   alter a connection status indicator of the second one of the network cards when the user plugs a cable into the second one of the network cards.

16. The storage medium of claim 14, wherein the first and second host servers are communicatively coupled as a cluster and communicatively coupled to the shared storage.

17. The storage medium of claim 16, wherein the data structure comprises internet protocol information for each of the first and second host servers corresponding to ones of the configuration names in the list of configuration names, wherein the instructions further cause the machine to assign the internet protocol information corresponding to the first name for the second host server to the second one of the network cards when configuring the second host server.

* * * * *